United States Patent
Yatsuda et al.

(10) Patent No.: US 9,333,901 B2
(45) Date of Patent: May 10, 2016

(54) VEHICLE HEADLIGHT AND OPTICAL FIBER BUNDLE USED IN VEHICLE HEADLIGHT

(71) Applicant: Stanley Electric Co., Ltd., Tokyo (JP)

(72) Inventors: Yasushi Yatsuda, Tokyo (JP); Takahiko Nozaki, Tokyo (JP); Takeshi Waragaya, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/312,499

(22) Filed: Jun. 23, 2014

(65) Prior Publication Data

US 2014/0376246 A1   Dec. 25, 2014

(30) Foreign Application Priority Data

Jun. 21, 2013   (JP) .................................. 2013-130627

(51) Int. Cl.
| | |
|---|---|
| *F21V 9/00* | (2015.01) |
| *B60Q 1/04* | (2006.01) |
| *F21S 8/10* | (2006.01) |
| *F21V 8/00* | (2006.01) |
| *G02B 6/04* | (2006.01) |

(52) U.S. Cl.
CPC .................. *B60Q 1/04* (2013.01); *F21S 48/125* (2013.01); *F21S 48/1241* (2013.01); *F21S 48/1258* (2013.01); *F21S 48/1329* (2013.01); *F21S 48/1388* (2013.01); *F21S 48/145* (2013.01); *G02B 6/0006* (2013.01); *G02B 6/0008* (2013.01); *G02B 6/04* (2013.01)

(58) Field of Classification Search
CPC .... B60Q 1/04; F21S 48/1388; F21S 48/1329; F21S 48/145; F21S 48/125; F21S 48/1258; F21S 48/1241; G02B 6/0006; G02B 6/04; G02B 6/0008
USPC ............................ 362/510, 511, 583, 84, 257
See application file for complete search history.

(56) References Cited

U.S. PATENT DOCUMENTS

| | | | |
|---|---|---|---|
| 4,952,022 A | 8/1990 | Genovese | |
| 8,733,996 B2 * | 5/2014 | Kishimoto | .................... 362/554 |
| 8,833,991 B2 * | 9/2014 | Kishimoto et al. | ........... 362/511 |
| 8,911,128 B2 * | 12/2014 | Takahashi et al. | ............ 362/538 |

(Continued)

FOREIGN PATENT DOCUMENTS

| | | |
|---|---|---|
| DE | 10 2004 060 475 A1 | 7/2006 |
| JP | 11-195303 A | 7/1999 |
| JP | 2011-222260 A | 11/2011 |

OTHER PUBLICATIONS

Extended European Search Report for the related European Patent Application No. 14173335.2 dated Sep. 21, 2015.

*Primary Examiner* — Anne Hines
*Assistant Examiner* — Jose M Diaz
(74) *Attorney, Agent, or Firm* — Kenealy Vaidya LLP

(57) ABSTRACT

An optical fiber bundle is used in a vehicle headlight, the optical fiber bundle being configured by binding a plurality of optical fibers. Each optical fiber can include a core having an incident end face on which a laser beam is made incident and an emission end face from which the laser beam is emitted. A clad can surround the core. Emission end faces of the respective plurality of optical fibers can be arranged adjacent to one another on a substantially same plane to create an emission end face group, an external shape of which is a substantial rectangle.

18 Claims, 14 Drawing Sheets

(56) References Cited

U.S. PATENT DOCUMENTS

| | | |
|---|---|---|
| 8,956,028 B2 * | 2/2015 | Takahashi et al. ............ 362/538 |
| 9,080,732 B2 * | 7/2015 | Nozaki |
| 2005/0105301 A1 * | 5/2005 | Takeda et al. ................ 362/545 |
| 2005/0134527 A1 | 6/2005 | Ouderkirk et al. |
| 2006/0279950 A1 * | 12/2006 | Hama et al. ................... 362/257 |
| 2007/0008734 A1 * | 1/2007 | Bogner et al. ................ 362/509 |
| 2008/0030976 A1 * | 2/2008 | Murazaki et al. ............... 362/84 |
| 2008/0075406 A1 * | 3/2008 | Kadomi et al. ................ 385/79 |
| 2009/0296018 A1 * | 12/2009 | Harle et al. .................... 349/61 |
| 2011/0044070 A1 * | 2/2011 | Takahashi ..................... 362/553 |
| 2011/0194302 A1 * | 8/2011 | Kishimoto et al. ............ 362/511 |
| 2011/0249460 A1 | 10/2011 | Kushimoto |
| 2011/0279007 A1 * | 11/2011 | Kishimoto ....................... 313/45 |
| 2011/0280033 A1 * | 11/2011 | Kishimoto et al. ............ 362/543 |
| 2011/0280039 A1 * | 11/2011 | Kishimoto ..................... 362/554 |
| 2012/0314442 A1 * | 12/2012 | Takahashi et al. ............ 362/538 |
| 2013/0188389 A1 * | 7/2013 | Overturf ........................ 362/583 |
| 2013/0314893 A1 * | 11/2013 | Paquette .......................... 362/84 |
| 2014/0003074 A1 * | 1/2014 | Kishimoto ..................... 362/510 |
| 2014/0012354 A1 * | 1/2014 | Matsubara et al. ............. 607/93 |
| 2014/0029281 A1 * | 1/2014 | Suckling et al. .............. 362/510 |
| 2014/0078378 A1 * | 3/2014 | Demers et al. ................ 348/359 |
| 2014/0153276 A1 * | 6/2014 | Nozaki .......................... 362/551 |
| 2014/0168940 A1 * | 6/2014 | Shiomi et al. ................... 362/84 |
| 2014/0198377 A1 * | 7/2014 | Yoshioka et al. ............ 359/341.1 |
| 2015/0043241 A1 * | 2/2015 | Deshazer et al. ............. 362/558 |
| 2015/0049501 A1 * | 2/2015 | Bauer et al. ................... 362/510 |
| 2015/0078022 A1 * | 3/2015 | Bauer ........................... 362/510 |

* cited by examiner

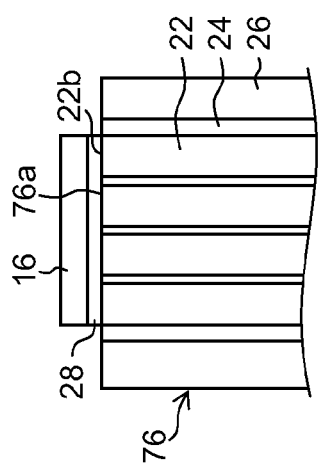
FIG.2
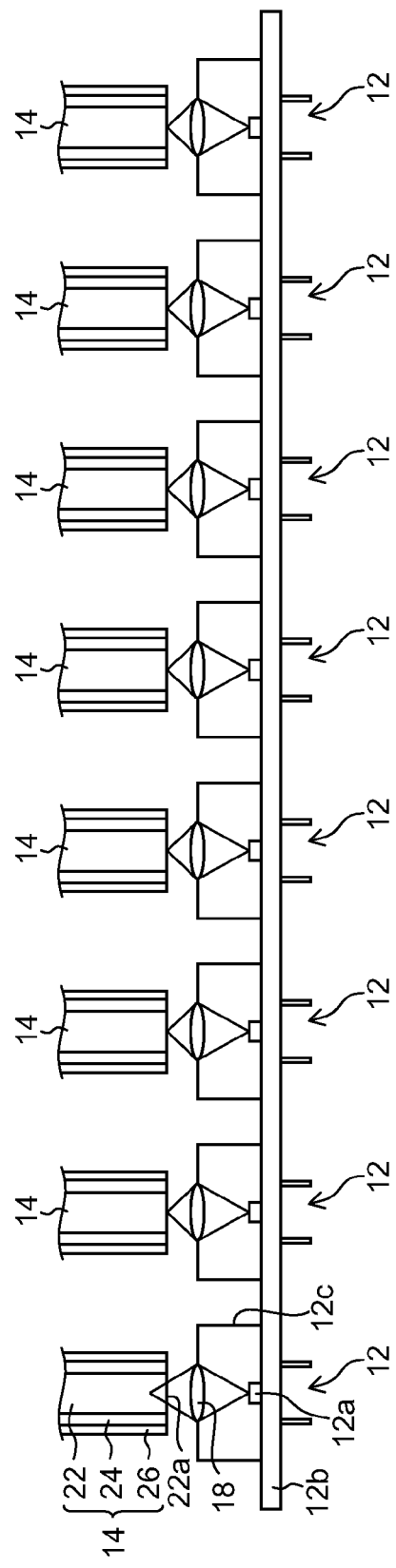

PROJECTOR OPTICAL SYSTEM

REFLECTOR OPTICAL SYSTEM

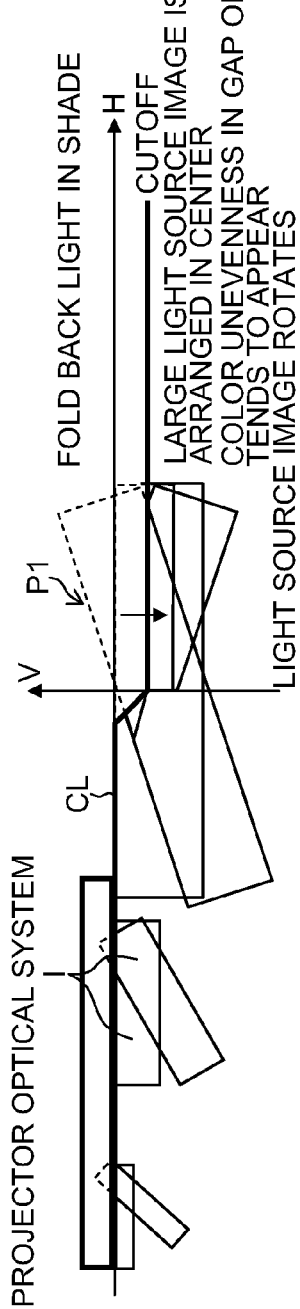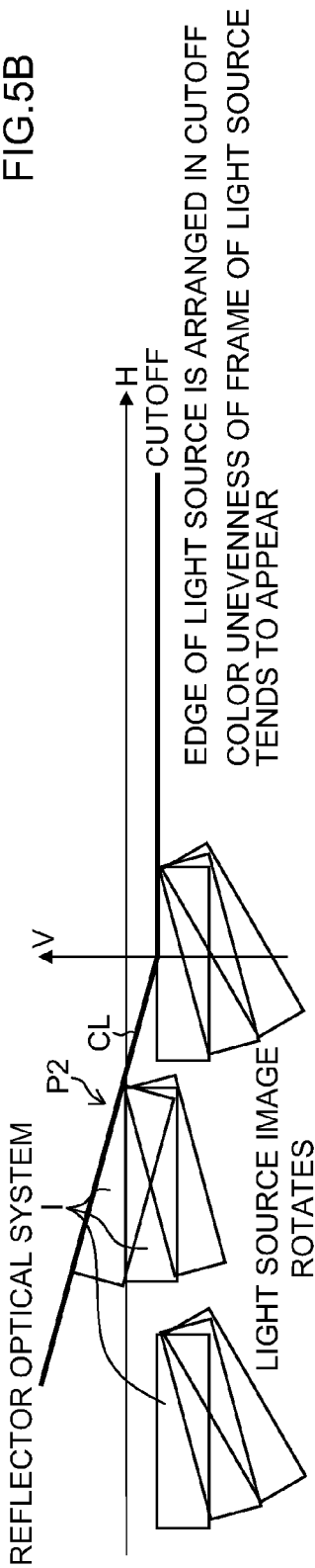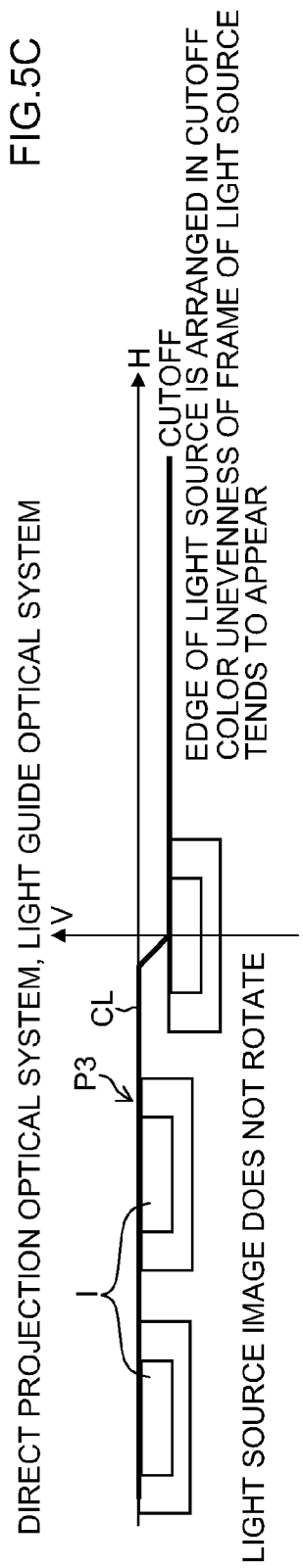

DIRECT PROJECTION OPTICAL SYSTEM

LARGE LIGHT AMOUNT PROJECTOR

TWICE REFLECTION TYPE REFLECTOR OPTICAL SYSTEM

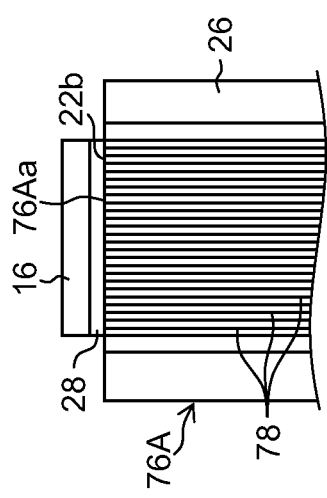
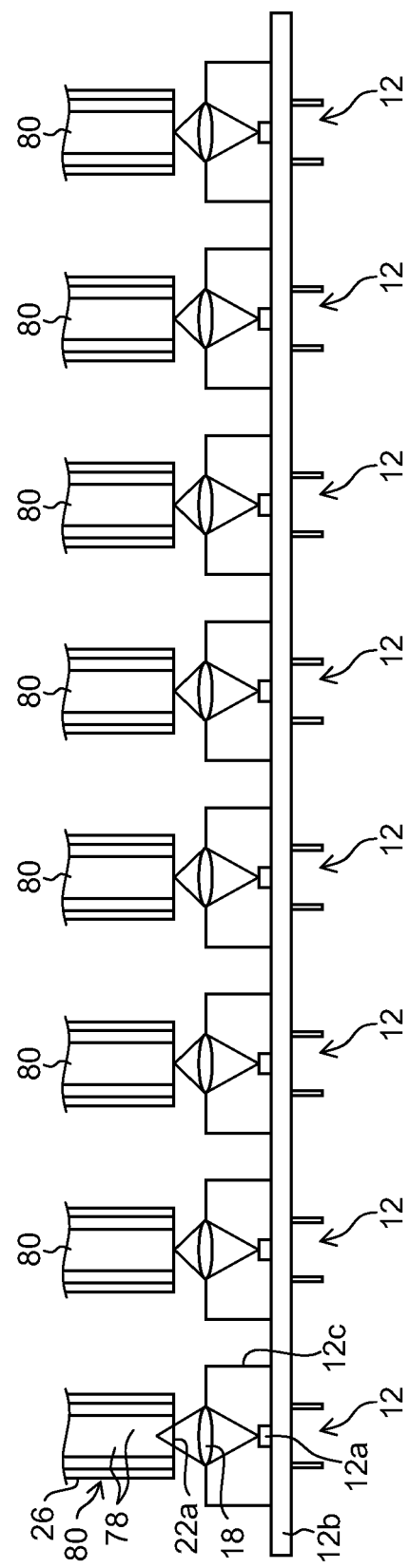
FIG.12

RELATED ART

VEHICLE HEADLIGHT AND OPTICAL FIBER BUNDLE USED IN VEHICLE HEADLIGHT

CROSS-REFERENCE TO RELATED APPLICATIONS

This application claims the priority benefit under 35 U.S.C. §119 of Japanese Patent Application No. JP 2013-130627 filed on Jun. 21, 2013, which is hereby incorporated in its entirety by reference.

BACKGROUND

1. Field

The presently disclosed subject matter relates to a vehicle headlight and an optical fiber bundle used in the vehicle headlight and, more particularly, to a vehicle headlight including optical fibers and an optical fiber bundle used in the vehicle headlight.

2. Description of the Related Art

In a field of lighting appliances, a vehicle headlight including optical fibers has been proposed (see, for example, Japanese Patent Application Laid-Open No. 2011-222260).

FIG. 15A is a perspective view of a vehicle headlight 200 described in Japanese Patent Application Laid-Open No. 2011-222260. FIG. 15B is a perspective view of a fluorescent body 220 used in the vehicle headlight 200.

As illustrated in FIG. 15A, the vehicle headlight 200 described in Japanese Patent Application Laid-Open No. 2011-222260 includes a plurality of laser beam sources 210, a fluorescent body 220 that receives laser beams and emits light, an optical fiber 230 that guides the laser beams emitted from the laser beam sources 210 to the fluorescent body 220, a reflecting mirror 240, a convex lens 250, and the like.

As illustrated in FIG. 15B, the fluorescent body 220 is configured as a fluorescent body including a light receiving surface 220a and a light emitting surface 220b on the opposite side of the light receiving surface 220a and having a block shape as a whole. The optical fiber 230 is configured as a bundle of a plurality of optical fibers including a plurality of incident ends 230a and a plurality of emission ends 230b from which laser beams made incident from the plurality of incident ends 230a are emitted. The plurality of emission ends 230b are retained in a ferrule 270 while being inserted into holes formed in the ferrule 270. The plurality of emission ends 230b are arranged to be opposed to the fluorescent body 220 (the light receiving surface 220a).

In the vehicle headlight 200 having the configuration explained above, when the laser beams emitted from the plurality of emission ends 230b are emitted to the fluorescent body 220 (the light receiving surface 220a), the fluorescent body 220 (the light receiving surface 220a) emits light in a rectangular shape. The emitted light of the fluorescent body 220 is reflected on the reflecting mirror 240. After a part of the emitted light is blocked by a shade 260, the emitted light is transmitted through the convex lens 250 and is emitted to the front and forms a light distribution pattern for a low beam.

SUMMARY

However, in the vehicle headlight 200 having the configuration explained above, the plurality of emission ends 230b are inserted into holes formed in the ferrule 270 and retained in a state in which gaps are formed among the emission ends 230b (see FIG. 15B). The fluorescent body 220 (the light receiving surface 220a) is not uniformly (or substantially uniformly) emitted over the entire area of the fluorescent body 220 (the light receiving surface 220a) and is sparsely emitted. As a result, luminance unevenness occurs and a rectangular light emitting section that uniformly (or substantially uniformly) emits light cannot be realized.

The presently disclosed subject matter has been devised in view of such circumstances and to realize, in a vehicle headlight including optical fibers, a rectangular light emitting section that uniformly (or substantially uniformly) emits light with reduced luminance unevenness.

A vehicle headlight of a first aspect of the presently disclosed subject matter can include: a plurality of laser beam sources; an optical fiber bundle configured by binding a plurality of optical fibers, the plurality of optical fibers respectively corresponding to the plurality of laser beam sources, an optical fiber including a core including an incident end face on which a laser beam emitted from a laser beam source corresponding thereto among the plurality of laser beam sources is made incident and an emission end face from which the laser beam introduced from the incident end face is emitted, and a clad that surround the core; a wavelength conversion member configured to receive laser beams emitted from emission end faces of the respective plurality of optical fibers and convert at least a part of the laser beams into light having a wavelength different from a wavelength of the laser beams; and an optical system configured to project a light source image of the wavelength conversion member and form a predetermined light distribution pattern. The emission end faces of the respective plurality of optical fibers are arranged adjacent to one another on a same or substantially same plane and configure an emission end face group, an external shape of which is a substantial rectangle (i.e., a perfect rectangle or a shape that is generally recognized as rectangular). The wavelength conversion member is arranged on the emission end face group.

According to the first aspect, advantages explained below may be obtained.

First, in the vehicle headlight including the optical fibers, it is possible to realize a rectangular light emitting section that uniformly (or substantially uniformly) emits light with reduced luminance unevenness. This is because, since the emission end faces of the respective plurality of optical fibers are arranged adjacent to one another on the substantially same plane (i.e., on the same plane or nearly on the same plane, or arranged in a crowded state) and configure the emission end group, the external shape of which is the substantial rectangle, the intensities (the powers) of laser beams emitted from the emission end face group are uniform (or substantially uniform) and, as a result, the laser beams are uniformly (or substantially uniformly) emitted over the entire area of the wavelength conversion member.

Second, in the related art (see, for example, Japanese Patent Application Laid-Open No. 2011-222260), for sparsely emitting light on the wavelength conversion member, by increasing the thickness of the light emitting section (the wavelength conversion member), it is possible to realize the rectangular light emitting section (the wavelength conversion member) that uniformly (or substantially uniformly) emits light. However, because of the increase in the thickness of the light emitting section (the wavelength conversion member), light absorbed by scattering or the like inside the light emitting section (the wavelength conversion member) increases and efficiency can be deteriorated. On the other hand, in the first aspect of the disclosed subject matter, it is possible to realize, without increasing the thickness of the light emitting section (the wavelength conversion member), the rectangular light emitting section (the wavelength conversion member) that uniformly (or substantially uniformly) emits light. Therefore, compared with the related art, there is an advantage that efficiency is not deteriorated.

Third, the optical fiber bundle and the plurality of laser beam sources are used. Consequently, it is possible to realize the rectangular light emitting section (the wavelength conversion member) that uniformly (or substantially uniformly) emits light at high power and is suitable for the vehicle headlight.

Fourth, a control device that individually controls the powers of the plurality of laser beam sources is provided. Consequently, it is possible to realize the rectangular light emitting section (the wavelength conversion member) that has gradations bright in an area along a side corresponding to a cutoff line and gradually becoming darker further away from the area and is suitable for the vehicle headlight.

Fifth, a detecting device that detects an object in front of an own vehicle and a control device that individually subjects the plurality of laser beam sources to lighting and extinction control on the basis of a detection result of the detecting device are provided. Consequently, it is possible to realize the vehicle headlight of a variable luminous intensity distribution type that can change a luminous intensity distribution on the basis of the detection result of the object in front of the own vehicle.

The vehicle headlight of a second aspect of the presently disclosed subject matter is configured such that, in the first aspect, each of the plurality of optical fibers is configured as an individual optical fiber bundle configured by binding a plurality of individual optical fibers, an individual optical fiber including the core including the incident end face on which the laser beam emitted from the laser beam source corresponding thereto among the plurality of laser beam sources is made incident and the emission end face from which the laser beam introduced from the incident end face is emitted, and the clad surrounding the core.

According to the second aspect, the individual optical fiber bundle is used. Consequently, it is possible to further reduce a sectional size of each of the optical fibers.

The vehicle headlight of a third aspect of the presently disclosed subject matter is configured such that, in the first or second aspect, the core is configured such that a cross section of the core perpendicular to fiber axis is a substantial rectangle.

According to the third aspect, in the vehicle headlight including the optical fibers, it is possible to further improve uniformity of the rectangular light emitting section. This is because, since the optical fibers including the cores, the cross sections of which are substantial rectangles, are used, compared with when optical fibers including cores, cross sections of which are substantial circles (i.e., perfect circles or shapes that are generally recognized as circular), are used, the intensities (the powers) of the laser beams emitted from the emission end faces are uniform (or substantially uniform).

The vehicle headlight of a fourth aspect of the presently disclosed subject matter is configured such that, in the third aspect, the core is configured such that a core cross section of a part of the core including the incident end face is a substantial circle and a core cross section of a part of the core including the emission end face is a substantial rectangle.

According to the fourth aspect, since the laser beams from the laser beam sources are condensed by a condensing lens in a substantial circle, the core cross sections of the core portions including the incident end faces are formed in substantial circles. Therefore, compared with when the core cross sections of the core portions including the incident end faces are substantial rectangles, it is possible to improve incidence efficiency of the laser beams on the incident end faces.

The vehicle headlight of a fifth aspect of the presently disclosed subject matter is configured such that, in any one of the first to fourth aspects, the plurality of optical fibers are fused to one another at least at ends on an emission end face side.

According to the fifth aspect, it is possible to maintain the external shape of the emission end face group.

The vehicle headlight of a sixth aspect of the presently disclosed subject matter is configured such that, in any one of the first to fifth aspects, the emission end face group is a substantial rectangle, a ratio of a short side and a long side of an external shape of which is 1:2 to 1:8.

According to the sixth aspect, it is possible to realize the rectangular light emitting section (the wavelength conversion member) that uniformly (or substantially uniformly) emits light with reduced luminance unevenness and is suitable for the vehicle headlight.

The vehicle headlight of a seventh aspect of the presently disclosed subject matter is configured such that, in any one of the first to sixth aspects, an external shape of the wavelength conversion member is formed the same as or substantially the same as the external shape of the emission end face group, and the wavelength conversion member is arranged on the emission end face group in a state in which the external shape of the wavelength conversion member and the external shape of the emission end face group coincide with or substantially coincide with each other and the wavelength conversion member covers the emission end faces.

According to the seventh aspect, the wavelength conversion member is arranged on the emission end face group while covering the emission end face group without protruding from the external shape of the emission end face group and without a gap formed between the wavelength conversion member and the emission end face group. Therefore, it is possible to realize the rectangular light emitting section in which luminance unevenness (or color unevenness) due to protrusion of the wavelength conversion member from the external shape of the emission end face group and luminance unevenness (or color unevenness) due to formation of a gap between the wavelength conversion member and the emission end face group and that is suitable for a light source of the vehicle headlight.

The vehicle headlight of an eighth aspect of the presently disclosed subject matter is configured such that, in any one of the first to seventh aspects, one long side forming an external shape of the emission end face group includes a side corresponding to a left horizontal cutoff line, a side corresponding to a right horizontal cutoff line, and a side corresponding to an oblique cutoff line that connects the left horizontal cutoff line and the right horizontal cutoff line.

According to the eighth aspect, the one long side forming the external shape of the emission end face group is formed as the long side including the side corresponding to the left horizontal cutoff line, the side corresponding to the right horizontal cutoff line, and the side corresponding to the oblique cutoff line that connects the left horizontal cutoff line and the right horizontal cutoff line. Therefore, it is possible to form a predetermined light distribution pattern (e.g., a light distribution pattern for a low beam) including a cutoff line without arraying a shade for forming a cutoff line in front of the rectangular light emitting section or the emission end face group.

That is, according to the eight aspect, when the predetermined light distribution pattern (e.g., the light distribution pattern for a low beam) including the cutoff line is formed, a shade for blocking a part of light from the rectangular light emitting section or the emission end face group is unnecessary. Therefore, it is possible to realize the vehicle headlight having extremely high light use efficiency.

The vehicle headlight of a ninth aspect of the presently disclosed subject matter is configured such that, in any one of the first to seventh aspects, the vehicle headlight further includes a shade configured to cover a part of the emission end face group.

According to the ninth aspect, in the vehicle headlight including the optical fibers, it is possible to form a predetermined light distribution pattern (e.g., a light distribution pattern for a low beam) including a cutoff line.

The vehicle headlight of a tenth aspect of the presently disclosed subject matter is configured such that, in any one of the first to ninth aspects, the vehicle headlight further includes: a detecting device configured to detect an object in front of a vehicle; and a control device configured to individually subject the plurality of laser beam sources to lighting and extinction control based on a detection result of the detecting device. The wavelength conversion member is divided into a plurality of wavelength conversion members corresponding to the emission end faces of the respective plurality of optical fibers. The plurality of wavelength conversion members are respectively arranged on the emission end faces. A light blocking member is arranged among the divided plurality of wavelength conversion members in order to prevent light from an individual wavelength conversion member from being made incident on a wavelength conversion member around the individual wavelength conversion member.

According to the tenth aspect, it is possible to realize the vehicle headlight of a luminous intensity distribution variable type that can change a luminous intensity distribution on the basis of the detection result of the object in front of the own vehicle.

The vehicle headlight of an eleventh aspect of the presently disclosed subject matter is configured such that, in any one of the first to tenth aspects, the optical system includes at least one of a reflection surface, a lens, and a light guide body.

According to the eleventh aspect, it is possible to project, with the optical system including at least one of the reflection surface, the lens, and the light guide body, a light source image of the rectangular light emitting section (the wavelength conversion member), which uniformly (or substantially uniformly) emits light, and form a predetermined light distribution pattern.

An optical fiber bundle of a twelfth aspect of the presently disclosed subject matter is configured by binding a plurality of optical fibers, an optical fiber including a core including an incident end face on which a laser beam is made incident and an emission end face from which the laser beam is emitted, and a clad surrounding the core, the optical fiber bundle being used in a vehicle headlight. The emission end faces of the respective plurality of optical fibers are arranged adjacent to one another on a same or substantially same plane and configure an emission end face group, an external shape of which is a substantial rectangle.

According to the twelfth aspect, advantages explained below are obtained.

First, in the vehicle headlight including the optical fibers, it is possible to realize a rectangular light emitting section that uniformly (or substantially uniformly) emits light with reduced luminance unevenness. This is because, since the emission end faces of the respective plurality of optical fibers are arranged adjacent to one another on the same or the substantially the same plane (i.e., arranged in a crowded state) and configure the emission end group, the external shape of which is the rectangle or the substantial rectangle, the intensities (the powers) of laser beams emitted from the emission end face group are uniform (or substantially uniform) and, as a result, the laser beams is uniformly (or substantially uniformly) emitted over the entire area of the wavelength conversion member.

Second, in the related art (see, for example, Japanese Patent Application Laid-Open No. 2011-222260) for sparsely emitting light on the wavelength conversion member, by increasing the thickness of the light emitting section (the wavelength conversion member), it is possible to realize the rectangular light emitting section (the wavelength conversion member) that uniformly (or substantially uniformly) emits light. However, because of the increase in the thickness of the light emitting section (the wavelength conversion member), light absorbed by scattering or the like inside the light emitting section (the wavelength conversion member) increases and efficiency is deteriorated. On the other hand, in the twelfth aspect of the disclosed subject matter, it is possible to realize, without increasing the thickness of the light emitting section (the wavelength conversion member), the rectangular light emitting section (the wavelength conversion member) that uniformly (or substantially uniformly) emits light. Therefore, compared with the related art, there is an advantage that efficiency is not deteriorated.

Third, the optical fiber bundle and the plurality of laser beam sources are used. Consequently, it is possible to realize the rectangular light emitting section (the wavelength conversion member) that uniformly (or substantially uniformly) emits light at high power and is suitable for the vehicle headlight.

Fourth, a control device that individually controls the powers of the plurality of laser beam sources is provided. Consequently, it is possible to realize the rectangular light emitting section (the wavelength conversion member) that has gradations bright in an area along a side corresponding to a cutoff line and gradually becoming darker further away from the area and is suitable for the vehicle headlight.

Fifth, a detecting device that detects an object in front of an own vehicle and a control device that individually subjects the plurality of laser beam sources to lighting and extinction control on the basis of a detection result of the detecting device are provided. Consequently, it is possible to realize the vehicle headlight of a luminous intensity distribution variable type that can change a luminous intensity distribution on the basis of the detection result of the object in front of the own vehicle.

The optical fiber bundle of a thirteenth aspect of the presently disclosed subject matter is configured such that, in the twelfth aspect, each of the plurality of optical fibers is configured as an individual optical fiber bundle configured by binding a plurality of individual optical fibers, an individual optical fiber including the core including the incident end face on which laser beam is made incident and the emission end face from which the laser beam is emitted, and the clad surrounding the core.

According to the thirteenth aspect, the individual optical fiber bundle is used. Consequently, it is possible to further reduce a sectional size of each of the optical fibers.

The optical fiber bundle of a fourteenth aspect of the presently disclosed subject matter is configured such that, in the twelfth or thirteenth, the core is configured such that a cross section of the core perpendicular to fiber axis is a substantial rectangle.

According to the fourteenth aspect, in the vehicle headlight including the optical fibers, it is possible to further improve uniformity of the rectangular light emitting section. This is because, since the optical fibers including the cores, the cross sections of which are rectangles or substantial rectangles, are used, compared with when optical fibers including cores, cross sections of which are substantial circles, are used, the intensities (the powers) of the laser beams emitted from the emission end faces are uniform (or substantially uniform).

The optical fiber bundle of a fifteenth aspect of the presently disclosed subject matter is configured such that, in the fourteenth aspect, the core is configured such that a core cross section of a part of the core including the incident end face is a substantial circle and a core cross section of a part of the core including the emission end face is a substantial rectangle.

According to the fifteenth aspect, since the laser beams from the laser beam sources are condensed by a condensing lens in a substantial circle, the core cross sections of the core portions including the incident end faces are formed in substantial circles. Therefore, compared with when the core cross sections of the core portions including the incident end faces are rectangles substantial rectangles, it is possible to improve incidence efficiency of the laser beams on the incident end faces.

The optical fiber bundle of a sixteenth aspect of the presently disclosed subject matter is configured such that, in any one of the twelfth to fifteenth aspects, the plurality of optical fibers are fused to one another at least at ends on an emission end face side.

According to the sixteenth aspect, it is possible to maintain the external shape of the emission end face group.

The optical fiber bundle of a seventeenth aspect of the presently disclosed subject matter is configured such that, in any one of the twelfth to sixteenth aspects, the emission end face group is a substantial rectangle, a ratio of a short side and a long side of an external shape of which is 1:2 to 1:8.

According to the seventeenth aspect, it is possible to realize the rectangular light emitting section that uniformly (or substantially uniformly) emits light with reduced luminance unevenness and is suitable for the vehicle headlight.

The optical fiber bundle of an eighteenth aspect of the presently disclosed subject matter is configured such that, in any one of the twelfth to seventeenth aspects, one long side forming an external shape of the emission end face group includes a side corresponding to a left horizontal cutoff line, a side corresponding to a right horizontal cutoff line, and a side corresponding to an oblique cutoff line that connects the left horizontal cutoff line and the right horizontal cutoff line.

According to the eighteenth aspect, the one long side forming the external shape of the emission end face group is formed as the long side including the side corresponding to the left horizontal cutoff line, the side corresponding to the right horizontal cutoff line, and the side corresponding to the oblique cutoff line that connects the left horizontal cutoff line and the right horizontal cutoff line. Therefore, it is possible to form a predetermined light distribution pattern (e.g., a light distribution pattern for a low beam) including a cutoff line without arraying a shade for forming a cutoff line in front of the rectangular light emitting section or the emission end face group.

More specifically, according to the eighteenth aspects, when the predetermined light distribution pattern (e.g., the light distribution pattern for a low beam) including the cutoff line is formed, a shade for blocking a part of light from the rectangular light emitting section or the emission end face group is unnecessary. Therefore, it is possible to realize the vehicle headlight having extremely high light use efficiency.

A vehicle headlight of a nineteenth aspect includes: a plurality of laser beam sources; a plurality of wavelength conversion members respectively corresponding to the plurality of laser beam sources, a wavelength conversion member receiving a laser beam emitted from a laser beam source corresponding thereto among the plurality of laser beam sources and converting at least a part of the laser beam into light having a wavelength different from a wavelength of the laser beam; an optical fiber bundle configured by binding a plurality of optical fibers respectively corresponding to the plurality of wavelength conversion members, the plurality of optical fiber including a core including an incident end face on which light from the wavelength conversion member corresponding thereto among the plurality of wavelength conversion members is made incident and an emission end face from which the light introduced from the incident end face is emitted, and a clad surrounding the core; and an optical system configured to project a light source image of the emission end faces and form a predetermined light distribution pattern. The emission end faces of the respective plurality of optical fibers are arranged adjacent to one another on a same or substantially same plane and configure an emission end face group, an external shape of which is a substantial rectangle. The wavelength conversion members are arranged between the laser beam sources and the incident end faces.

According to the nineteenth aspect, it is possible to attain an effect same as the effect in the first aspect.

The vehicle headlight of a twentieth aspect of the presently disclosed subject matter is configured such that, in the nineteenth aspect, each of the plurality of optical fibers is configured as an individual optical fiber bundle configured by binding a plurality of individual optical fibers, an individual optical fiber including the core including the incident end face on which light from the wavelength conversion member corresponding thereto among the plurality of wavelength conversion members is made incident and the emission end face from which the light introduced from the incident end face is emitted, and the clad surrounding the core.

According to the twentieth aspect, it is possible to attain an effect same as the effect in the second aspect.

According to the presently disclosed subject matter, it is possible to realize, in a vehicle headlight including optical fibers, a rectangular light emitting section that uniformly (or substantially uniformly) emits light with reduced luminance unevenness.

BRIEF DESCRIPTION OF THE DRAWINGS

FIG. 2 is a sectional view illustrating the configuration of an optical fiber bundle and the like used in the vehicle headlight of FIG. 1;

FIG. 5A is an example of a light source image projected on an imaginary vertical screen by the projector optical system shown in FIG. 4A;

FIG. 5B is an example of the light source image projected on the imaginary vertical screen by the reflector optical system shown in FIG. 4B;

FIG. 5C is an example of the light source image projected on the imaginary vertical screen by a so-called direct projection optical system shown in FIG. 6;

FIG. 12 is a sectional view illustrating the configuration of the optical fiber bundle of FIG. 11A;

DETAILED DESCRIPTION OF EXEMPLARY EMBODIMENTS

Vehicle lights according to embodiments of the presently disclosed subject matter are explained below with reference to the drawings.

Figure 1:
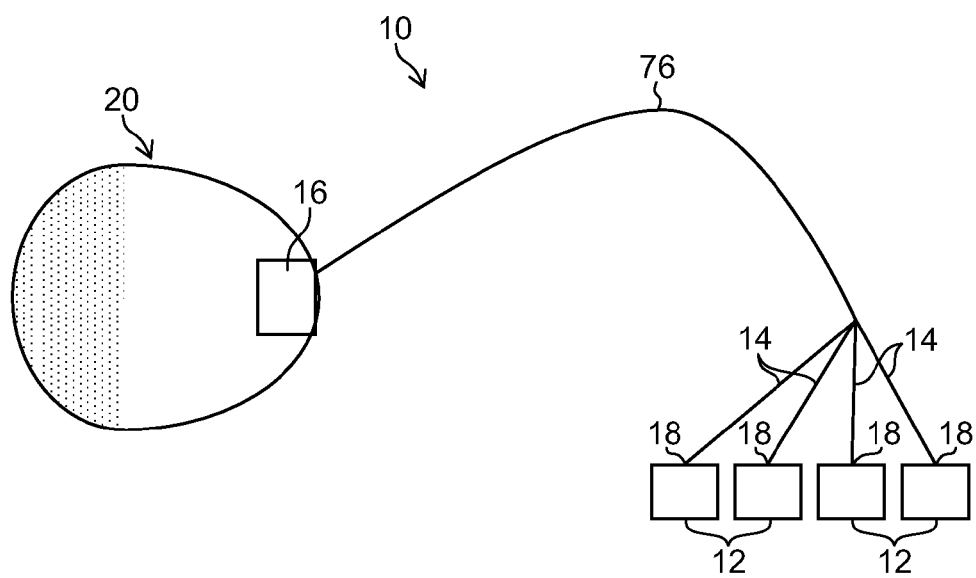
FIG. 1 is a schematic configuration diagram of an exemplary embodiment of a vehicle headlight made in accordance with principles of the presently disclosed subject matter.

FIG. 1 is a schematic configuration diagram of a vehicle headlight 10 according to an embodiment of the disclosed subject matter. FIG. 2 is a sectional view illustrating the configuration of an optical fiber bundle 76 and the like used in the vehicle headlight 10.

As illustrated in FIGS. 1 and 2, the vehicle headlight 10 in this embodiment includes a plurality of laser beam sources 12, an optical fiber bundle 76 configured by binding a plurality of optical fibers 14, a wavelength conversion member 16, a plurality of condensing lenses 18, an optical system 20, and the like.

The laser beam sources 12 are laser beam sources that emit laser beams in a blue region (e.g., a light emission wavelength is 450 nm). Specifically, the laser beam sources 12 are configured as a can-type semiconductor laser beam source packaged to include laser diodes 12a (LD elements). The laser beam sources 12 may be laser beam sources that emit laser beams in a near-ultraviolet region (e.g., a light emission wavelength is 405 nm) or in regions other than the near ultraviolet region.

The laser beam sources 12 are mounted on the surface of a mounting board 12b and are housed in a holder 12c also mounted on the surface of the mounting board 12b. In the holder 12c, an opening through which laser beams emitted from the laser diodes 12a pass, is formed. The condensing lenses 18 are retained in the holder 12c while covering the opening. The optical axes of the laser beam sources 12 are orthogonal to incident end faces 22a of cores 22 of the optical fibers 14 corresponding to the laser beam sources 12.

The plurality of optical fibers 14 are provided to correspond to the plurality of laser beam sources 12.

The optical fibers 14 are configured as optical fibers including the cores 22 including the incident end faces 22a on which laser beams emitted from the laser beam sources 12 corresponding thereto among the plurality of laser beam sources 12 are condensed by the condensing lenses 18 and made incident and emission end faces 22b from which the laser beams introduced from the incident end faces 22a are emitted and clads 24 that surround the cores 22. The clads 24 are covered with coating 26. The material of the cores 22 and the clads 24 may be quartz glass or may be synthetic resin.

Figure 3A:
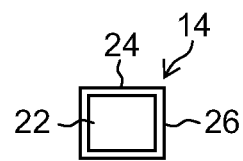
FIG. 3A is a sectional view of an optical fiber of the vehicle headlight of FIG. 1.
Figure 3B:
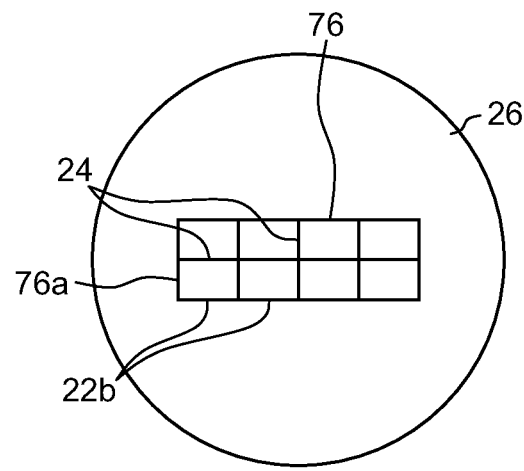
FIG. 3B is a front view of an end on a side of an emission end face of an optical fiber bundle of the vehicle headlight of FIG. 1.
Figure 3C:
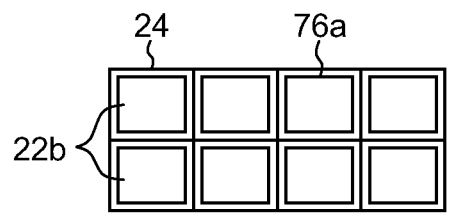
FIG. 3C is a diagram illustrating a state in which emission end faces of a respective plurality of optical fibers of the vehicle headlight of FIG. 1 are arranged adjacent to one another in a 2×4 matrix shape and an emission end face group, an external shape of which is a rectangle (or a substantial rectangle), is configured.

FIG. 3A is a sectional view of the optical fiber 14. FIG. 3B is a front view of an end on the emission end face 22b side of the optical fiber bundle 76. FIG. 3C is a diagram illustrating a state in which the emission end faces 22b of the respective plurality of the optical fibers 14 are arranged adjacent to one another in a 2×4 matrix shape and an emission end face group 76a, an external shape of which is a rectangle (or a substantial rectangle), is configured.

As illustrated in FIG. 3A, the core 22 is configured as a core, a cross section of which perpendicular to a fiber axis (hereinafter referred to as core cross section; the same applies to the incident end faces 22a and the emission end faces 22b), is a substantial rectangle (i.e., a rectangle or a shape that would generally be recognized as a rectangle such as a shape that has two sets of sides that are opposed and parallel with respect to each other but are connected by rounded or other shaped connection surfaces).

Since the optical fiber 14 including the core 22, the core cross section of which is the substantial rectangle, is used, compared with when an optical fiber including a core, a core cross section of which is a substantial circle (i.e., a circle or generally circular shape) is used, it is possible to make the intensities (the powers) of laser beams emitted from the emission end faces 22b uniform (or substantially uniform). As a result, it is possible to uniformly (or substantially uniformly) emit the laser beams over the wavelength conversion member 16.

The core cross section does not have to be a complete or perfect rectangle and only has to be a substantial rectangle (which includes a perfect rectangle and other almost rectangular shapes). For example, because of a manufacturing reason, four corners of the core cross section sometimes are not completely right-angled and are slightly rounded or sides of the core cross section sometimes are not linear and are curved. Even in such cases, compared with when the optical fiber including the core, the core cross section of which is the substantial circle, it is possible to make the intensities (the powers) of the laser beams emitted from the emission end faces 22b uniform (or substantially uniform).

The optical fiber 14 can be manufactured as explained below.

First, a substantially square pole-shaped core rod is formed. The substantially square pole-shaped core rod is inserted into a glass tube, which is formed as a clad section, heated from the surrounding, and melted to contract the glass tube and form an optical fiber base material in which the core rod and the glass tube are integrated. Thereafter, the optical fiber base material is drawn. This manufacturing method is described in detail in, for example, WO 03/075058. In the manufacturing, speed and the like of the drawing is adjusted such that the clad is not formed in a circle and is formed in a thin film shape (or a layered shape) along the outer periphery of the core. Alternatively, the thickness of the glass tube, which is formed as the clad section, is adjusted such that the clad is not formed in a circle and is formed in a thin film shape (or layered shape) along the outer periphery of the core.

As explained above, the optical fiber 14 including the core 22, the core cross section of which is the substantial rectangle, and the thin film-like (or layered) clad 24 along the outer periphery of the core 22 can be manufactured. The optical fiber 14 can be manufactured using another manufacturing method described in Japanese Patent Application Laid-Open No. 2009-168914.

For example, as illustrated in FIG. 3B, the optical fiber bundle 76 is configured as an optical fiber bundle obtained by binding eight optical fibers 14 (bound at least at ends on the emission end faces 22b side). Eight is only an example. It goes without saying that other numbers of the optical fibers 14 may be bound.

The emission end faces 22b of the respective eight optical fibers 14 are arranged adjacent to one another on the same or substantially the same plane in a 2×4 matrix shape and configure the emission end face group 76a, an external shape of which is a rectangle (or a substantial rectangle). The eight optical fibers 14 are fused or bonded to one another at least the ends on the emission end faces 22b side. Consequently, the external shape of the emission end face group 76a is maintained in the substantial rectangle.

It is desirable that the emission end face group 76a is a substantial rectangle, a ratio of a short side and a long side of the external shape of which is 1:2 to 1:8. Consequently, it is possible to realize the rectangular light emitting section (the wavelength conversion member 16) that uniformly (or substantially uniformly) emits light with reduced luminance unevenness and is suitable for a light source of the vehicle headlight.

The optical fiber bundle 76 can be manufactured as explained below.

First, the eight optical fibers 14 are prepared. The coating 26 of a fixed length is removed from the ends on a side of the emission end faces 22b of the optical fibers 14 to expose a part of the clads 24.

Subsequently, at least the ends on the emission end faces 22b side of the optical fibers 14 (the partially exposed clad sections) are bound such that, as illustrated in FIG. 3C, the emission end faces 22b of the respective plurality of optical fibers 14 are arranged adjacent to one another in a matrix shape of 2×4 on the same (or substantially the same) plane and the emission end face group 76a, the external shape of which is the rectangle (or the substantially rectangle), is configured. The clads 24 of the optical fibers 14 are fixed by fixing means such as fusing or bonding. Consequently, the external shape of the emission end face group 76a is maintained in the substantial rectangle. When the clads 24 of the optical fibers 14 are fused, the optical fiber bundle 76 in which the clads 24 of the optical fibers 14 are fused and integrated is configured.

The periphery of the ends on the emission end faces 22b side of the optical fibers 14 (the partially exposed clad sections) fixed in this way is covered with the coating 26 (see FIGS. 2 and 3B).

The optical fiber bundle 76 can be manufactured as explained above.

In the manufacturing of the optical fiber bundle 76, it is also possible that a frame body (not illustrated in the figure) made of metal or glass having a sectional shape substantially the same as the external shape (the substantial rectangle) of the emission end face group 76a is prepared, the ends on the emission end faces 22b side of the optical fibers 14 (the partially exposed clad sections) bound as explained above are inserted into the frame body while being closely attached to the frame body, after the ends are retained in the frame body, the clads of the optical fibers 14 are fixed by fixing means such as fusing or bonding. Consequently, it is possible to easily align the ends on the emission end faces 22b side of the optical fibers 14 (the partially exposed clad sections) as illustrated in FIG. 3B. In addition, it is possible to maintain the external shape of the emission end face group 76a in the substantial rectangle even in a stage before the fusing or the bonding. Therefore, it is possible to easily perform fixing work such as the fusing or the bonding.

When a frame body (e.g., a capillary) made of glass is used as the frame body, the optical fiber bundle 76 in which the frame body made of glass and the clads 24 of the optical fibers 14 are fused and integrated is configured.

The wavelength conversion member 16 is a wavelength conversion member that receives laser beams emitted from the emission end face group 76a (i.e., the emission end faces 22b) and converts at least a part of the laser beams into light having a wavelength different from a wavelength of the laser beams. Specifically, the wavelength conversion member 16 is configured as a tabular or layered fluorescent body that is excited by a laser beam in the blue region (e.g., a light emission wavelength is 450 nm) and emits yellow light. The wavelength conversion member 16 may be configured as a tabular or layered fluorescent body that is excited by a laser beam in the near-ultraviolet region (e.g., a light emission wavelength is 405 nm) and emits lights of three colors; red, green, and blue. For example, it is possible to form the tabular fluorescent body by dispersing particles (an inorganic fluorescent body) having a size of several microns to several ten microns in a translucent retaining body such as glass or alumina. It is possible to form the layered fluorescent body by applying fluorescent body particles (a mixture of the fluorescent body particles and a translucent binder) on a diffuser.

The wavelength conversion member 16 is arranged while being opposed to the emission end face group 76a. For example, as illustrated in FIG. 2, the wavelength conversion member 16 is arranged while being bonded to the emission end face group 76a via a bonding layer 28. The external shape (the contour) of the wavelength conversion member 16 is configured the same (or substantially the same) as the external shape of the emission end face group 76*a*. The wavelength conversion member 16 is arranged in a state in which the external shape of the wavelength conversion member 16 and the external shape of the emission end face group 76*a* coincide with (or substantially coincide with) each other and the wavelength conversion member 16 covers the emission end face group 76*a*.

In this way, the wavelength conversion member 16 is arranged on the emission end face group 76*a* while covering the emission end face group 76*a* without protruding from the external shape of the emission end face group 76*a* and without a gap formed between the wavelength conversion member 16 and the emission end face group 76*a*. Therefore, luminance unevenness (or color unevenness) due to protrusion of the wavelength conversion member 16 from the external shape of the emission end face group 76*a* and luminance unevenness (or color unevenness) due to formation of a gap between the wavelength conversion member 16 and the emission end face group 76*a* are suppressed.

In the optical fiber bundle 76 having the configuration explained above, the laser beams from the laser beam sources 12 are condensed by the condensing lenses 18, introduced into the cores 22 from the incident end faces 22*a* of the optical fibers 14, emitted from the emission end face group 76*a* (i.e., the emission end faces 22*b*), and are emitted on the wavelength conversion member 16. In that case, the emission end faces 22*a* of the respective plurality of optical fibers 14 are arranged adjacent to one another in a matrix shape of 2×4 on the same (or substantially the same) plane (i.e., arranged in a crowded state) and configure the emission end face group 76*a*, the external shape of which is the substantial rectangle. Therefore, the intensities (the powers) of the laser beams emitted from the emission end face group 76*a* are uniform (or substantially uniform). The laser beams are uniformly (or substantially uniformly) emitted over the entire area of the wavelength conversion member 16. As a result, compared with the related art for sparsely emitting light on the wavelength conversion member (see, for example, Japanese Patent Application Laid-Open No. 2011-222260), the rectangular light emitting section (the wavelength conversion member 16) that uniformly (or substantially uniformly) emits light with reduced luminance unevenness is realized.

In the related art for sparsely emitting the light on the wavelength conversion member (see, for example, Japanese Patent Application Laid-Open No. 2011-222260), by increasing the thickness of the light emitting section (the wavelength conversion member), it is possible to realize the rectangular light emitting section (the wavelength conversion member) that uniformly (or substantially uniformly) emits light. However, because of the increase in the thickness of the light emitting section (the wavelength conversion member), light absorbed by scattering or the like inside the light emitting section (the wavelength conversion member) increases and efficiency is deteriorated. On the other hand, in this embodiment, it is possible to realize, without increasing the thickness of the light emitting section (the wavelength conversion member 16), the rectangular light emitting section (the wavelength conversion member 16) that uniformly (or substantially uniformly) emits light. Therefore, compared with the related art, there is an advantage that efficiency is not deteriorated.

When a laser beam in the blue region is emitted, the wavelength conversion member 16 emits white light (pseudo white light) formed by mixing of the laser beam in the blue region transmitted through the wavelength conversion member 16 and emitted light (yellow light) by the laser beam in the blue region. On the other hand, when a laser beam in the near-ultraviolet region is emitted, the wavelength conversion member 16 emits white light (pseudo white light) formed by mixing of emitted lights (lights of three colors of red, green, and blue) by the laser beam in the near-ultraviolet region.

The optical system 20 is an optical system configured to project a light source image of the rectangular light emitting section (the wavelength conversion member 16), which uniformly (or substantially uniformly) emits light with reduced luminance unevenness, and form a predetermined light distribution pattern (a light distribution pattern for a low beam or a light distribution pattern for a high beam). The optical system 20 is configured as an optical system including at least one of a reflection surface, a lens, and a light guide body.

A specific configuration of the optical system 20 is illustrated below.

Figure 4A:
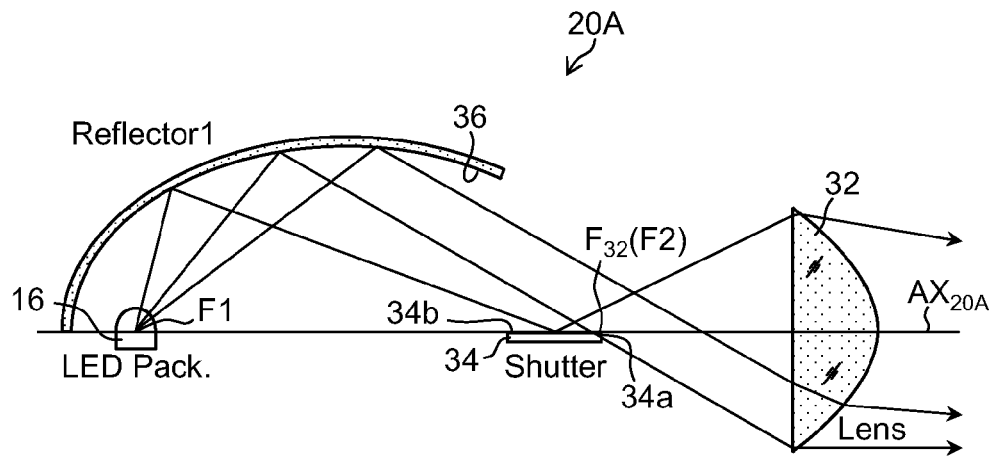
FIG. 4A is an example in which an optical system of a vehicle headlight made in accordance with principles of the presently disclosed subject matter is configured as a projector optical system including a projection lens, a shade, and a reflection surface.

FIG. 4A is an example in which the optical system 20 is configured as a projector optical system 20A including a projection lens 32, a shade 34, and a reflection surface 36.

As illustrated in FIG. 4A, the rectangular light emitting section (the wavelength conversion member 16) is arranged further backward than a rear focus F32 and near an optical axis AX20A of the projection lens 32 to emit light upward.

A sectional shape of the reflection surface 36 including the optical axis AX20A is an elliptical shape including a first focus F1 and a second focus F2. The reflection surface 36 is configured as a reflection surface of a spheroidal system (a spheroidal surface or a free curved surface similar to the spheroidal surface), eccentricity of which is set to gradually increase from a vertical cross section to a horizontal cross section.

The reflection surface 36 covers, in a dome shape, a range from a side to an upper area of the rectangular light emitting section (the wavelength conversion member 16) (excluding an area on a vehicle front side through which reflected light from the reflection surface 36 passes) such that light from the light emitting section (the wavelength conversion member 16) emitted upward (in a semispherical direction) is made incident on the reflection surface 36.

The shade 34 includes a plane mirror 34*b* extending backward from an edge section 34*a* arranged near the rear side focus F32 of the projection lens 32. The edge section 34*a* is curved in a shape corresponding to a cutoff line and to correspond to a field curvature of the projection lens 32.

In the vehicle headlight 10 including the optical system 20A having the configuration explained above, a light source image I of the rectangular light emitting section (the wavelength conversion member 16), which uniformly (or substantially uniformly) emits light, is projected on an imaginary vertical screen (arranged in a position about 25 m ahead of the vehicle headlight 10) opposed to the vehicle headlight 10 by the optical system 20A as illustrated in FIG. 5A. This is because the shape of the reflection surface 36 is adjusted such that the light source image I of the rectangular light emitting section (the wavelength conversion member 16) is projected as illustrated in FIG. 5A. A part of the light source image I is reflected on the shade 34 (the plane mirror 34*b*) and folded back with respect to a cutoff line CL, whereby the cutoff line CL is formed.

As explained above, a luminous distribution pattern P1 for a low beam including the cutoff line CL is formed.

It is also possible to form a light distribution pattern for a high beam by omitting the shade 34 and adjusting the shape of the reflection surface 36.

Figure 4B:
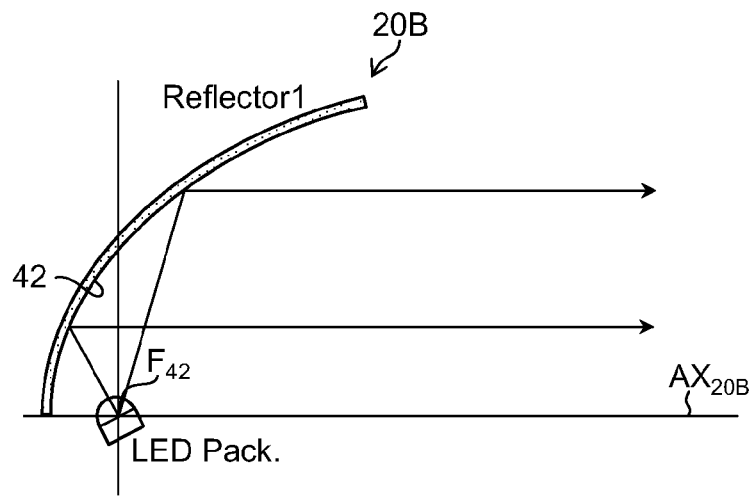
FIG. 4B is an example in which the optical system of another embodiment of a vehicle headlight is configured as a reflector optical system including a reflection surface.

FIG. 4B is an example in which the optical system 20 is configured as a reflector optical system 20B including a reflection surface 42.

As illustrated in FIG. 4B, the rectangular light emitting section (the wavelength conversion member 16) is arranged near a focus F42 of the reflection surface 42.

The reflection surface 42 is configured as a reflection surface of a paraboloidal system (a paraboloidal surface of a free curved surface or the like similar to the paraboloidal surface). The reflection surface 42 is arranged above (or below) an optical axis AX20B.

In the vehicle headlight 10 including the optical system 20B having the configuration explained above, the light source image I of the rectangular light emitting section (the wavelength conversion member 16), which uniformly (or substantially uniformly) emits light, is projected on the imaginary vertical screen by the optical system 20B as illustrated in FIG. 5B. This is because the shape of the reflection surface 42 is adjusted such that the light source image I of the rectangular light emitting section (the wavelength conversion member 16) is projected as illustrated in FIG. 5B.

As explained above, a light distribution pattern P2 for a low beam including the cutoff line CL is formed.

It is also possible to form a light distribution pattern for a high beam by adjusting the shape of the reflection surface 42.

Figure 6:
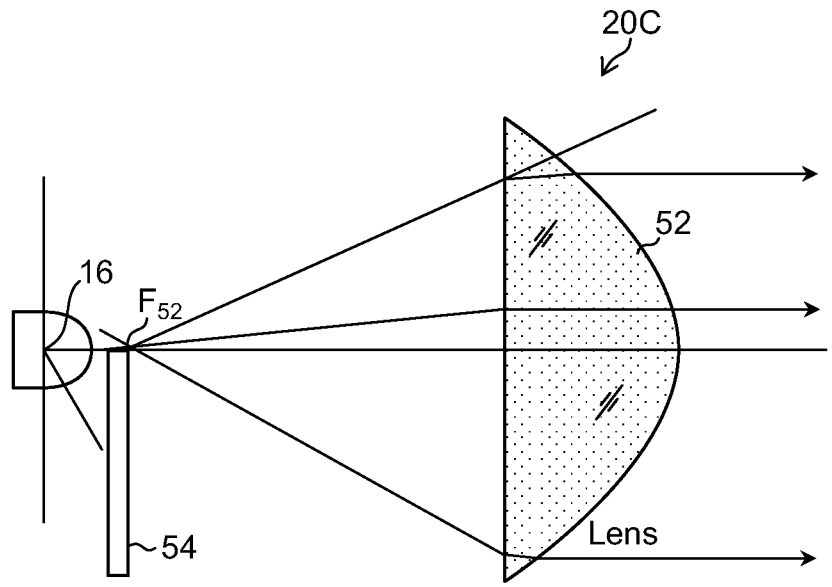
FIG. 6 is an example in which the optical system of an exemplary vehicle light is configured as the direct projection optical system including a projection lens and a shade.

FIG. 6 is an example in which the optical system 20 is configured as a so-called direct projection optical system 20C including a projection lens 52 and a shade 54.

As illustrated in FIG. 6, the rectangular light emitting section (the wavelength conversion member 16) is arranged near a rear side focus F52 of the projection lens 52. The shade 54 is arranged in front of the rectangular light emitting section (the wavelength conversion member 16) in a state in which an upper end edge of the shade 54 is located near the rear side focus F52 of the projection lens 52 and covers a part of the rectangular light emitting section (the wavelength conversion member 16). The shade 54 may be arranged in a position apart from the rectangular light emitting section (the wavelength conversion member 16) or may be arranged in a position in contact with the rectangular light emitting section (the wavelength conversion member 16).

Figure 7:
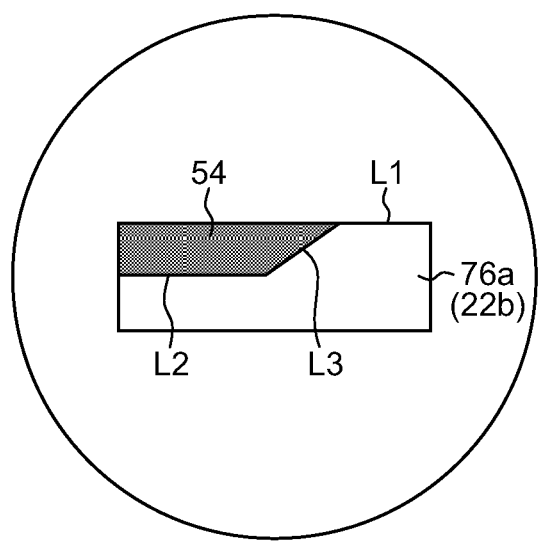
FIG. 7 is an example in which the shade covers a part of the emission end face of the vehicle light of FIG. 6.

As illustrated in FIG. 7, the shade 54 may cover a part of the emission end face group 76a. FIG. 7 is an example in which the shade 54 covers a part of the emission end face group 76a such that one long side forming the external shape of the emission end face group 76a is formed as a long side including a side L1 corresponding to a left horizontal cutoff line, a side L2 corresponding to a right horizontal cutoff line, and a side L3 corresponding to an oblique cutoff line that connects the left horizontal cutoff line and the right horizontal cutoff line.

In this case, the external shape (the contour) of the wavelength conversion member 16 is formed the same (or substantially the same) as the external shape of an area other than the shade 54 in the emission end face group 76a. The wavelength conversion member 16 is arranged on the emission end face group 76a in a state in which the external shape of the wavelength conversion member 16 and the external shape of the area other than the shade 54 in the emission end face group 76a coincide (or substantially coincide) with each other and the wavelength conversion member 16 is bonded to the emission end face group 76a via the bonding layer 28 and covers the emission end face group 76a.

In the vehicle headlight 10 including the optical system 20C having the configuration explained above, the light source image I of the rectangular light emitting section (the wavelength conversion member 16), which uniformly (or substantially uniformly) emits light, is projected on the imaginary vertical screen by the optical system 20C as illustrated in FIG. 5C. This is because the shape of at least one of the front surface and the rear surface of the projection lens 52 is adjusted such that the light source image I of the rectangular light emitting section (the wavelength conversion member 16) is projected as illustrated in FIG. 5C.

As explained above, a light distribution pattern P3 for a low beam including the cutoff line CL is formed.

It is also possible to form a light distribution pattern for a high beam by omitting the shade 54 and adjusting the shape of at least one of the front surface and the rear surface of the projection lens 52.

Figure 8:
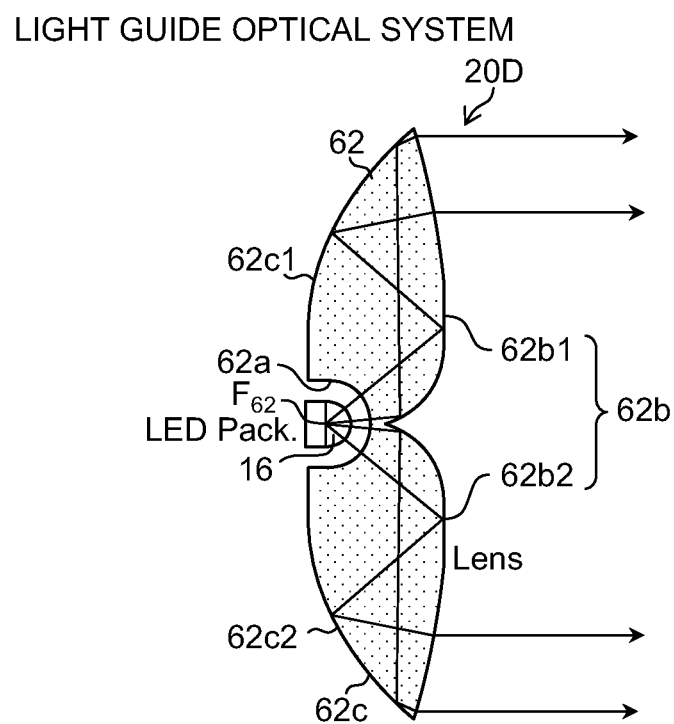
FIG. 8 is an example in which the optical system of another exemplary vehicle light is configured as a light guide optical system including a light guide body (a light guide lens)

FIG. 8 is an example in which the optical system 20 is configured as a light guide optical system 20D including a light guide body 62 (a light guide lens).

As illustrated in FIG. 8, the rectangular light emitting section (the wavelength conversion member 16) is arranged near a reference point F62 in optical design of the light guide body 62.

The light guide body 62 is a translucent member made of transparent resin such as acrylic or polycarbonate including a light incident surface 62a, a front surface 62b, a rear surface 62c, and the reference point F62 in optical design. The light guide body 62 is configured such that light from the rectangular light emitting section (the wavelength conversion member 16) made incident from the light incident surface 62a is reflected at least in a part of the front surface 62b (a first front surface 62b1 and a second front surface 62b2), further reflected in at least a part of the rear surface 62c (a first rear surface 62c1 and a second rear surface 62c2), and, then, emitted from at least in a part of the front surface 62b (the first front surface 62b1 and the second front surface 62b2) and emitted to the front.

In the vehicle headlight 10 including the optical system 20D having the configuration explained above, the light source image I of the rectangular light emitting section (the wavelength conversion member 16), which uniformly (or substantially uniformly) emits light, is projected on the imaginary vertical screen by the optical system 20D as illustrated in FIG. 5C. This is because a surface shape of at least one of the light incident surface 62a, the front surface 62b, and the rear surface 62c is designed such that the light source image I of the rectangular light emitting section (the wavelength conversion member 16) is projected as illustrated in FIG. 5C. A method of designing the surfaces is described in detail in, for example, U.S. Pat. No. 7,460,985.

As explained above, the light distribution pattern P3 for a low beam including the cutoff line CL is formed.

It is also possible to form a light distribution pattern for a high beam by adjusting the shape of at least one of the light incident surface 62a, the front surface 62b, and the rear surface 62c.

Figure 9A:
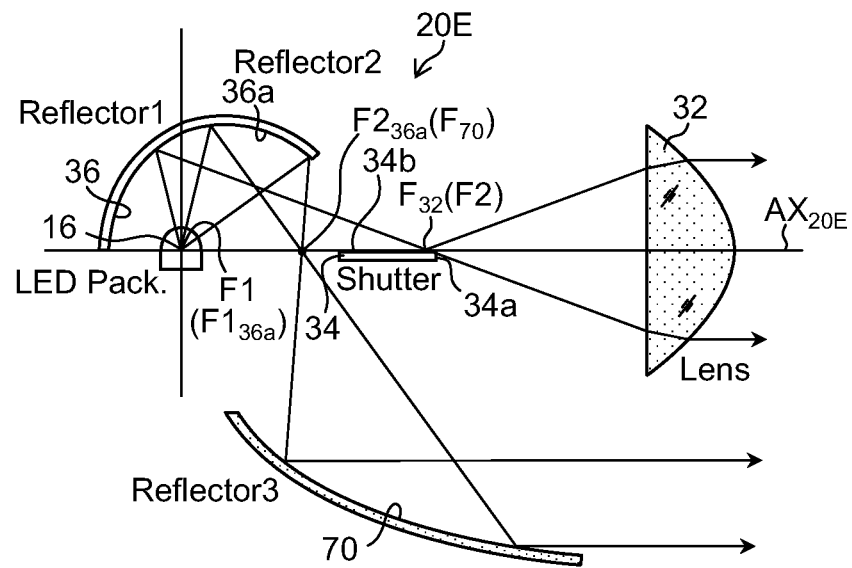
FIG. 9A is an example in which the optical system of another exemplary vehicle light is configured as a large light amount projector optical system based on the projector optical system.

FIG. 9A is an example in which the optical system 20 is configured as a large light amount projector optical system 20E based on the projector optical system 20A.

The optical system 20E is different from the projector optical system 20A (see FIG. 4A) in that the front end of the reflection surface 36 is extended to the projection lens 32 side and that an additional reflection surface 70 is added. Otherwise, the optical system 20E has a configuration same as the configuration of the projector optical system 20A. The differences from the projector optical system 20A are mainly explained below. Components same as those of the projector optical system 20A are designated by the same reference numerals and characters and explanation of the components is omitted.

The front end of the reflection surface 36 is extended to the projection lens 32 side to configure an extended reflection area 36*a* not to block light reflected on the reflection surface 36 and transmitted through the projection lens 32.

The extended reflection area 36*a* is configured as a reflection system of a spheroidal surface, a first focus F136*a* of which is set near the rectangular light emitting section (the wavelength conversion member 16) and a second focus F236*a* of which is set between the reflection surface 36 and the additional reflection surface 70.

The additional reflection surface 70 is configured as a reflection surface of a paraboloidal system, a focus F70 of which is set near the second focus F236*a*. The additional reflection surface 70 is set below an optical axis AX20E such that reflected light from the extended reflection area 36*a* is made incident on the additional reflection surface 70.

In the vehicle headlight 10 including the optical system 20E having the configuration explained above, compared with the projector optical system 20A (see FIG. 4A), more light source image I of the rectangular light emitting section (the wavelength conversion member 16) can be projected to the front by the extended reflection area 36*a* and the additional reflection surface 70. Therefore, it is possible to form a brighter light distribution pattern for a low beam.

Figure 9B:
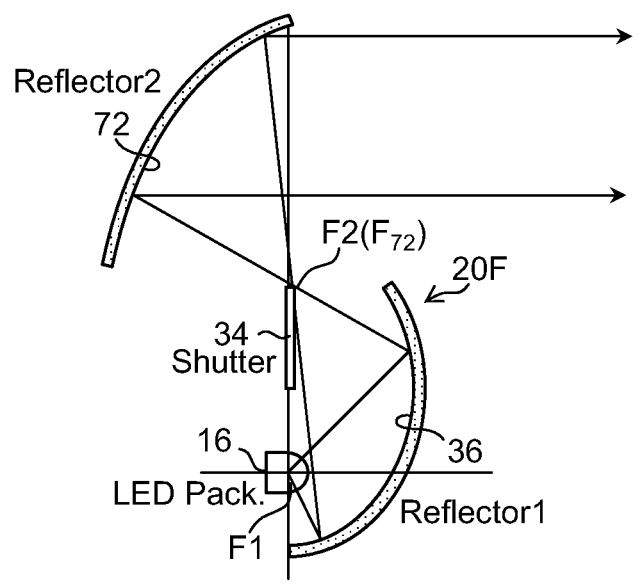
FIG. 9B is an example in which the optical system of another exemplary vehicle light is configured as a twice reflection type reflector optical system based on the projector optical system.

FIG. 9B is an example in which the optical system 20 is configured as a twice reflection type reflector optical system 20F based on the projector optical system 20A.

The optical system 20F is different from the projector optical system 20A (see FIG. 4A) in that the shade 34, the reflection surface 36, and the like are vertically placed and that the projection lens 32 is omitted and an additional reflection surface 72 is added. Otherwise, the optical system 20F has a configuration same as the configuration of the projector optical system 20A. Differences from the projector optical system 20A are mainly explained below. Components same as those of the projector optical system 20A are designated by the same reference numbers and characters and explanation of the components is omitted.

The additional reflection surface 72 is configured as a reflection surface of a paraboloidal system, a focus F72 of which is set near the second focus F2. The additional reflection surface 72 is arranged further above the upper end of the shade 34 and further on the vehicle rear side than the shade 34 such that reflected light from the reflection surface 36 is made incident on the additional reflection surface 72.

In the vehicle headlight 10 including the optical system 20F having the configuration explained above, the light source image I of the rectangular light emitting section (the wavelength conversion member 16), which uniformly (or substantially uniformly) emits light, is projected on the imaginary vertical screen by the optical system 20F as illustrated in FIG. 5A. Consequently, the light distribution pattern P1 for a low beam including the cutoff line CL is formed.

As explained above, according to this embodiment, advantages explained below are obtained.

First, in the vehicle headlight 10 including the optical fibers 14, it is possible to realize the rectangular light emitting section (the wavelength conversion member 16) that uniformly (or substantially uniformly) emits light with reduced luminance unevenness. This is because, since the emission end faces 22*b* of the respective plurality of optical fibers 14 are arranged adjacent to one another on the same (or the substantially) the same plane (i.e., arranged in a crowded state) and configure the emission end face group 76*a*, the external shape of which is the rectangle or the substantial rectangle, the intensities (the powers) of laser beams emitted from the emission end face group 76*a* are uniform (or substantially uniform) and, as a result, the laser beams are uniformly (or substantially uniformly) emitted over the entire area of the wavelength conversion member 16.

Second, in the related art (see, for example, Japanese Patent Application Laid-Open No. 2011-222260) for sparsely emitting light on the wavelength conversion member, by increasing the thickness of the light emitting section (the wavelength conversion member), it is possible to realize the rectangular light emitting section (the wavelength conversion member) that uniformly (or substantially uniformly) emits light. However, because of the increase in the thickness of the light emitting section (the wavelength conversion member), light absorbed by scattering or the like inside the light emitting section (the wavelength conversion member) increases and efficiency is deteriorated. On the other hand, in this embodiment, it is possible to realize, without increasing the thickness of the light emitting section (the wavelength conversion member 16), the rectangular light emitting section (the wavelength conversion member 16) that uniformly (or substantially uniformly) emits light. Therefore, compared with the related art, there is an advantage that efficiency is not deteriorated.

Third, the optical fiber bundle 76 and the plurality of laser beam sources 12 are used. Consequently, it is possible to realize the rectangular light emitting section (the wavelength conversion member 16) that uniformly (or substantially uniformly) emits light at high power and is suitable for the vehicle headlight.

Fourth, a control device that individually controls the powers of the plurality of laser beam sources 12 is provided. Consequently, it is possible to realize the rectangular light emitting section (the wavelength conversion member 16) that has gradations bright in an area along a side corresponding to a cutoff line and gradually becoming darker further away from the area and is suitable for the vehicle headlight.

Fifth, a detecting device that detects an object in front of an own vehicle and a control device that individually subjects the plurality of laser beam sources 12 to lighting and extinction control on the basis of a detection result of the detecting device are provided. Consequently, it is possible to realize the vehicle headlight of a variable luminous intensity distribution type that can change a luminous intensity distribution on the basis of the detection result of the object in front of the own vehicle.

In the vehicle headlight 10 including the optical fibers 14, it is possible to further improve uniformity of the rectangular light emitting section (the wavelength conversion member 16). This is because, since the optical fibers 14 including the cores 22, the cross sections of which are rectangles (or substantial rectangles), are used, compared with optical fibers including cores, cross sections of which are substantial circles, the intensities (the powers) of the laser beams emitted from the emission end faces 22*b* are uniform (or substantially uniform).

A modification (a first modification) of the optical fiber 14 is explained.

Figure 10:
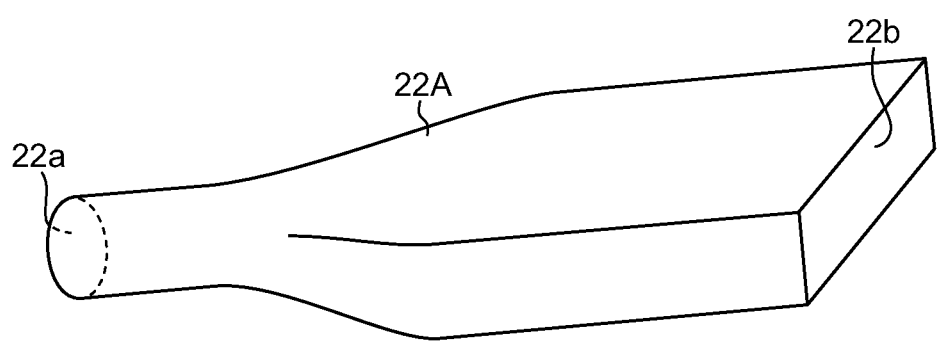
FIG. 10 is a perspective view of a core used in a modified optical fiber according to the disclosed subject matter.

FIG. 10 is a perspective view of a core 22A used in an optical fiber 14A, which is the first modification of the optical fiber 14.

The optical fiber 14A in this modification and the optical fiber 14 in the embodiment are different in that, whereas the core 22 of the optical fiber 14 in the embodiment is configured as the core, all the core cross sections of which between the incident end face 22*a* and the emission end face 22*b* are rectangles (or substantial rectangles), as illustrated in FIG. 10, the core 22A of the optical fiber 14A in this modification is configured as the core 22A, a core cross section of a core portion of which including the incident end face 22*a* is a substantial circle and a core cross section of a core portion of which including the emission end face 22b is a rectangle (or a substantial rectangle). Otherwise, the optical fiber 14A has a configuration same as the configuration of the optical fiber 14 in the embodiment. The differences from the optical fiber 14 in the embodiment are mainly explained. Components same as those of the optical fiber 14 in the embodiment are designated by the same reference numerals and characters and explanation of the components is omitted.

The optical fiber 14A in this modification can be manufactured by, for example, preparing an optical fiber, a core cross section of which is a substantial circle, and an optical fiber, a core cross section of which is a substantial rectangle, butting end faces of both optical fibers against each other, and fusing butted portions using an optical fiber fusing and connecting machine or the like. The optical fiber 14A in this modification can also be manufactured by, for example, the optical fiber, the core cross section of which is the substantial circle, and the optical fiber, the core cross section of which is the substantial rectangle, using a connector, a sleeve, or the like in a state in which the end faces of both optical fibers are butted against each other.

With the optical fiber 14A in this modification, a laser beam from the laser beam source 12 is condensed by the condensing lens 18 in a substantial circle, the core cross section of the core portion including the incident end face 22a are formed in substantial circles. Therefore, compared with when the core cross section of the core portion including the incident end face 22a is a rectangle (or a substantial rectangle), it is possible to improve incidence efficiency of the laser beams on the incident end face 22a.

A modification (a first modification) of the optical fiber bundle 76 is explained.

Figure 11A:
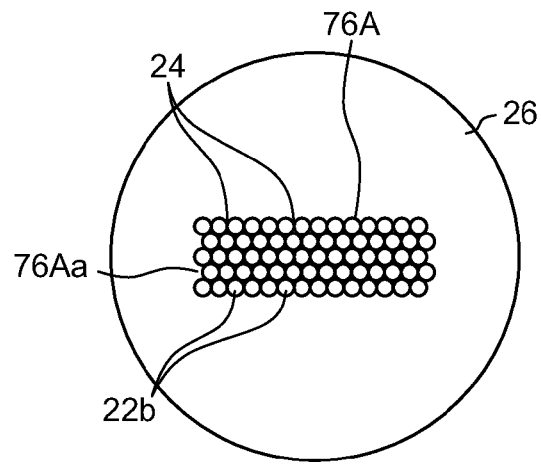
FIG. 11A is a front view of an end on a side of the emission end face of a modified optical fiber bundle according to the disclosed subject matter.

FIG. 11A is a front view of an end on the emission end face 22b side of an optical fiber bundle 76A, which is the first modification of the optical fiber bundle 76. FIG. 12 is a sectional view illustrating the configuration of the optical fiber bundle 76A and the like.

The optical fiber bundle 76A in this modification and the optical fiber bundle 76 in the embodiment are different in that, whereas, in the embodiment, the optical fiber 14 is configured as one optical fiber and the optical fiber bundle 76 is configured as the optical fiber bundle obtained by binding the eight optical fibers 14, in this modification, the optical fiber 14 is configured as an individual optical fiber bundle 80 obtained by binding a plurality of individual optical fibers 78 and the optical fiber bundle 76A is configured as an optical fiber bundle obtained by binding eight individual optical fiber bundles 80.

Further, the optical fiber bundle 76A in this modification and the optical fiber bundle 76 in the embodiment are different in that, whereas, in the embodiment, the core 22 of the optical fiber 14 is configured as the core, the core cross section of which is the substantial rectangle, in this modification, the core 22 of the individual optical fiber 78 is configured as a core, a core cross section (the same applies to the incident end face 22a and the emission end face 22b) of which is a substantial circle. Otherwise, the optical fiber bundle 76A has a configuration same as the configuration of the optical fiber bundle 76 in the embodiment. The differences from the optical fiber bundle 76 in the embodiment are mainly explained. Components same as those of the optical fiber bundle 76 in the embodiment are designated by the same reference numerals and characters and explanation of the components is omitted.

The individual optical fibers 78 are configured as optical fibers same as the general optical fiber including the cores 22 including the incident end faces 22a on which laser beams emitted from the laser beam sources 12 corresponding thereto among the plurality of laser beam sources 12 condensed by the condensing lenses 18 and are made incident and the emission end faces 22b from which the laser beams introduced from the incident end faces 22a are emitted and the clads 24 that surround the cores 22. The material of the cores 22 and the clads 24 may be quartz glass or may be synthetic resin.

The individual optical fiber bundles 80 are configured as optical fiber bundles same as general optical fiber bundles obtained by binding the plurality of individual optical fibers 78 (binding the plurality of individual optical fibers 78 at least the ends on the incident end faces 22a side and the ends on the emission end faces 22b side). The periphery of the individual optical fiber bundles 80 is covered with the coating 26.

For example, as illustrated in FIG. 12, the optical fiber bundle 76A is configured as an optical fiber bundle obtained by binding the eight individual optical fiber bundles 80 (binding the eight individual optical fiber bundles 80 at least at the ends on the emission end faces 22b side). Eight is only an example. It goes without saying that other numbers of the individual optical fiber bundles 80 may be bound.

As illustrated in FIG. 11A, the emission end faces 22b of the respective plurality of individual optical fibers 78 configuring the eight individual optical fiber bundles 80 are arranged adjacent to one another closely on the same (or substantially the same) plane and configure an emission end face group 76Aa, the external shape of which is a rectangle (or a substantial rectangle). The plurality of individual optical fibers 78 configuring the eight individual optical fiber bundles 80 are fused or bonded to one another at least at the ends on the emission end faces 22b side. Consequently, the external shape of the emission end face group 76Aa is maintained in the substantial rectangle.

It is desirable that the emission end face group 76Aa is a rectangle (or a substantial rectangle), a ratio of a short side and a long side of the external shape of which is 1:2 to 1:8. Consequently, it is possible to realize the rectangular light emitting section (the wavelength conversion member 16) that uniformly (or substantially uniformly) emits light with reduced luminance unevenness and is suitable for a light source of the vehicle headlight.

The optical fiber bundle 76A can be manufactured as explained below.

First, the eight individual optical fiber bundles 80 are prepared. The coating 26 of a fixed length is removed from the ends on the emission end faces 22b side of the individual optical fiber bundles 80 to expose a part of the clads 24.

Subsequently, at least the ends on the emission end faces 22b side of the respective plurality of individual optical fibers 78 configuring the eight individual optical fiber bundles 80 (the partially exposed clad sections) are bound such that, as illustrated in FIG. 11A, the emission end faces 22b of the respective plurality of individual optical fibers 78 configuring the eight individual optical fiber bundles 80 are arranged adjacent to one another closely on the same (or substantially the same) plane and the emission end face group 76Aa, the external shape of which is the rectangle (or the substantially rectangle), is configured. The clads 24 of the individual optical fibers 78 are fixed by fixing means such as fusing or bonding. Consequently, the external shape of the emission end face group 76Aa is maintained in the substantial rectangle. When the clads 24 of the individual optical fibers 78 are fused, the optical fiber bundle 76A in which the clads 24 of the individual optical fibers 78 are fused and integrated is configured.

The periphery of the ends on the emission end faces 22b side of the individual optical fibers (the partially exposed clad sections) fixed in this way is covered with the coating 26 (see FIGS. 11A and 12).

The optical fiber bundle 76A can be manufactured as explained above.

In the manufacturing of the optical fiber bundle 76A, it is also possible that a frame body (not illustrated in the figure) made of metal or glass having a sectional shape substantially the same as the external shape (the rectangle or the substantial rectangle) of the emission end face group 76Aa is prepared, the ends on the emission end faces 22b side of the individual optical fibers 78 (the partially exposed clad sections) bound as explained above are inserted into the frame body while being closely attached to the frame body, after the ends are retained in the frame body, the clads of the individual optical fibers 78 are fixed by fixing means such as fusing or bonding. Consequently, it is possible to easily align the ends on the emission end faces 22b side of the individual optical fibers 78 (the partially exposed clad sections) as illustrated in FIG. 11A. In addition, it is possible to maintain the external shape of the emission end face group 76Aa in the substantial rectangle even in a stage before the fusing or the bonding. Therefore, it is possible to easily perform fixing work such as the fusing or the bonding.

When a frame body (e.g., a capillary) made of glass is used as the frame body, the optical fiber bundle 76A in which the frame body made of glass and the clads 24 of the individual optical fibers 78 are fused and integrated is configured.

In this modification, as in the embodiment, the external shape (the contour) of the wavelength conversion member 16 is configured the same (or substantially the same) as the external shape of the emission end face group 76Aa. The wavelength conversion member 16 is arranged on the emission end face group 76Aa in a state in which the external shape of the wavelength conversion member 16 and the external shape of the emission end face group 76Aa coincide with (or substantially coincide with) each other, the wavelength conversion member 16 is bonded to the emission end face group 76Aa via the bonding layer 28 and the wavelength conversion member 16 covers the emission end face group 76Aa.

In this way, the wavelength conversion member 16 is arranged on the emission end face group 76Aa while covering the emission end face group 76Aa without protruding from the external shape of the emission end face group 76Aa and without a gap formed between the wavelength conversion member 16 and the emission end face group 76Aa. Therefore, it is possible to realize the rectangular light emitting section in which luminance unevenness (or color unevenness) due to protrusion of the wavelength conversion member 16 from the external shape of the emission end face group 76Aa and luminance unevenness (or color unevenness) due to formation of a gap between the wavelength conversion member 16 and the emission end face group 76Aa are suppressed and that is suitable for a light source of a vehicle headlight.

A modification (a second modification) of the optical fiber bundle 76 is explained.

Figure 11B:
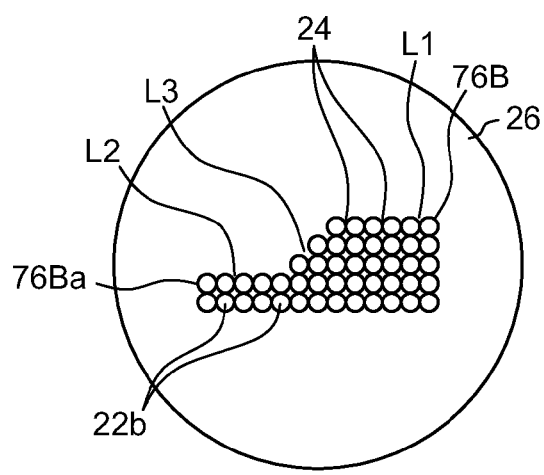
FIG. 11B is a front view of an end on a side of the emission end face of another modification of the optical fiber bundle according to the disclosed subject matter.

FIG. 11B is a front view of an end on the emission end faces 22b side of an optical fiber bundle 76B, which is a second modification of the optical fiber bundle 76.

The optical fiber bundle 76B in this modification and the optical fiber bundle 76A in the first modification are different in that, whereas, in the first modification, both long sides forming the external shape of the emission end face group 76Aa are formed as straight lines (see FIG. 11A), in this modification, one long side forming the external shape of an emission end face group 76Ba is formed as a long side including the side L1 corresponding to the left horizontal cutoff line, the side L2 corresponding to the right horizontal cutoff line, and the side L3 corresponding to the oblique cutoff line that connects the left horizontal cutoff line and the right horizontal cutoff line (see FIG. 11B). Otherwise, the optical fiber bundle 76B has a configuration same as the configuration of the optical fiber bundle 76A in the first modification.

The optical fiber bundle 76B in this modification can be manufactured by a manufacturing method same as the manufacturing method for the optical fiber bundle 76A in the first modification.

In this modification, as in the first modification, the external shape (the contour) of the wavelength conversion member 16 is configured the same (or substantially the same) as the external shape of the emission end face group 76Ba. The wavelength conversion member 16 is arranged on the emission end face group 76Ba in a state in which the external shape of the wavelength conversion member 16 and the external shape of the emission end face group 76Ba coincide with (or substantially coincide with) each other, the wavelength conversion member 16 is bonded to the emission end face group 76Ba via the bonding layer 28 and the wavelength conversion member 16 covers the emission end face group 76Ba.

In this way, the wavelength conversion member 16 is arranged on the emission end face group 76Ba while covering the emission end face group 76Ba without protruding from the external shape of the emission end face group 76Ba and without a gap formed between the wavelength conversion member 16 and the emission end face group 76Ba. Therefore, it is possible to realize the rectangular light emitting section in which luminance unevenness (or color unevenness) due to protrusion of the wavelength conversion member 16 from the external shape of the emission end face group 76Ba and luminance unevenness (or color unevenness) due to formation of a gap between the wavelength conversion member 16 and the emission end face group 76Ba are suppressed and that is suitable for a light source of a vehicle headlight.

The optical fiber bundle 76B in this modification can be suitably used, in particular, the direct projection optical system 20C illustrated in FIG. 6 and the light guide optical system 20D illustrated in FIG. 8.

With the optical fiber bundle 76B in this modification, the one long side forming the external shape of an emission end face group 76Ba is formed as the long side including the side L1 corresponding to the left horizontal cutoff line, the side L2 corresponding to the right horizontal cutoff line, and the side L3 corresponding to the oblique cutoff line that connects the left horizontal cutoff line and the right horizontal cutoff line. Therefore, it is possible to realize the optical fiber in which a predetermined light distribution pattern (e.g., a light distribution pattern for a low beam) including a cutoff line can be formed without arranging a shade for forming the cutoff line in front of the light emitting section (the wavelength conversion member 16) or the emission end face group 76Ba and that is suitable for a vehicle headlight.

More specifically, with the optical fiber bundle 76B in this modification, when the predetermined light distribution pattern (e.g., the light distribution pattern for a low beam) including the cutoff line is formed, a shade for blocking a part of light from the rectangular light emitting section (the wavelength conversion member 16) or the emission end face group 76Ba is unnecessary. Therefore, it is possible to realize the optical fiber bundle 76B in which a vehicle headlight having extremely high light use efficiency can be realized and that is suitable for a vehicle headlight.

With the optical fiber bundle 76B in this modification, the light source image I of the light emitting section (the wavelength conversion member 16) has a shape including a long side corresponding to one long side (the side L1, the side L2, and the side L3). Therefore, by arranging the light source image I near an intersection of a horizontal line and a vertical line on the imaginary vertical screen, it is possible to easily form a cutoff line including an oblique cutoff line.

Figure 11C:
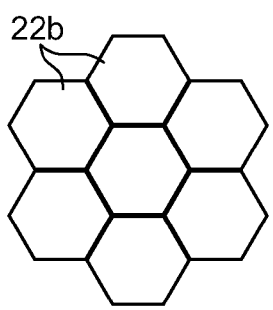
FIG. 11C is a diagram illustrating a modification of a core cross section of an individual optical fiber according to the disclosed subject matter.

FIG. 11C is a diagram illustrating a modification of the core cross section of the individual optical fiber 78.

In the optical fiber bundle 76A in the first modification and the optical fiber bundle 76B in the second modification, the individual optical fiber 78, a core cross section of which is formed in a hexagon (or a substantial hexagon) or a polygon having more than six sides, instead of the optical fiber bundle 76B, a core cross section of which is formed in substantial circle.

If the individual optical fiber 78, the core cross section of which is the hexagon (or the substantial hexagon), is used, as illustrated in FIG. 11C, the emission end faces 22b of the respective plurality of individual optical fibers 78 can be arranged adjacent to one another more closely. Therefore, compared with when the individual optical fiber 78, the core cross section of which is the substantial circle, is used, it is possible to further improve efficiency.

An example is explained in which the vehicle headlight 10 is configured as a vehicle headlight of a variable luminous intensity distribution type (ADB: Adaptive Driving Beam) that can change a luminous intensity distribution on the basis of a detection result of an object in front of an own vehicle.

The vehicle headlight can be realized by adding, for example, to the vehicle headlight 10 of the direct projection type (also referred to as direct emission type) configured to form a light distribution pattern for a high beam by omitting the shade 54 in the direct projection optical system 20C illustrated in FIG. 6 and adjusting the shape of at least one of the front surface and the rear surface of the projection lens 52, a detecting device that detects an object in front of an own vehicle and a control device that individually subjects the plurality of laser beam sources 12 to lighting and extinction control on the basis of a detection result of the detecting device.

As the detecting device, for example, a vehicle-mounted imaging device such as a CCD camera including a solid-state imaging element such as a CCD (Charge Coupled Device) can be used. As the control device, it is possible to use an ECU (Electrical Control Unit) or the like including a CPU (Central Processing Unit) and a RAM (Random Access Memory).

The control device individually subjects the plurality of laser beam sources 12 to lighting and extinction control on the basis of a detection result of the detecting device. For example, the control device determines, on the basis of the detection result of the detecting device, whether an emission prohibition target is present in an emission area of lights from the respective laser beam sources 12 (i.e., an emission area of lights emitted from the respective emission end faces 22b). When determining that the emission prohibition target is present, the control device performs control for, for example, extinguishing the laser beam source 12 that emits light on the emission area where the emission prohibition target is present. The detecting device that detects an object in front of the own vehicle and the control device that individually subject the light sources to lighting and extinction control on the basis of a detection result of the detecting device are explained in detail in, for example, Japanese Patent Application Laid-Open No. 2008-037240.

As a method of subjecting the plurality of laser beam sources 12 to lighting and extinction control (switching), besides turning on and off by a circuit, a method of controlling a laser beam from a singularity of the laser beam source 12 using a MEMS (Micro Electro Mechanical Systems) mirror is conceivable.

Figure 13:
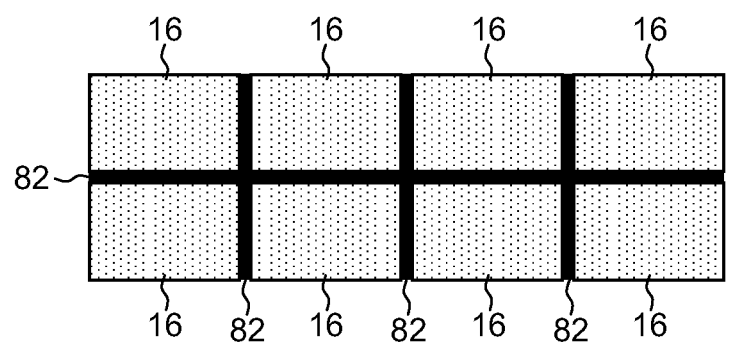
FIG. 13 is a diagram illustrating the configuration of a wavelength conversion member used in a vehicle headlight according to the disclosed subject matter having a variable luminous intensity distribution type that can change a luminous intensity distribution on the basis of a detection result of an object in front of the driven vehicle.

FIG. 13 is a diagram illustrating the configuration of the wavelength conversion member 16 used in the vehicle headlight of the variable luminous intensity distribution type that can change a luminous intensity distribution on the basis of a detection result of an object in front of an own vehicle.

In this modification, the wavelength conversion member 16 is divided into a plurality of wavelength conversion members 16 corresponding to the emission end faces 22b of the respective plurality of optical fibers 14 (or the emission end faces of the plurality of individual optical fiber bundles 80) and arranged on respective the emission end faces 22b.

For example, when the optical fiber bundle 76 illustrated in FIG. 3B is used, as illustrated in FIG. 13, the wavelength conversion member 16 is divided into a plurality of (eight) wavelength conversion members 16 corresponding to the emission end faces 22b of the respective plurality of optical fibers 14 and are arranged on the respective emission end faces 22. Light blocking members 82 are arranged among the divided plurality of wavelength conversion members 16 in order to prevent lights from the individual wavelength conversion members 16 from being made incident on the wavelength conversion members 16 around the individual wavelength conversion members 16. Consequently, it is possible to suppress luminance unevenness (or color unevenness) due to incidence of lights from the respective wavelength conversion members 16 on the wavelength conversion members 16 around the respective wavelength conversion members 16.

Figure 14:
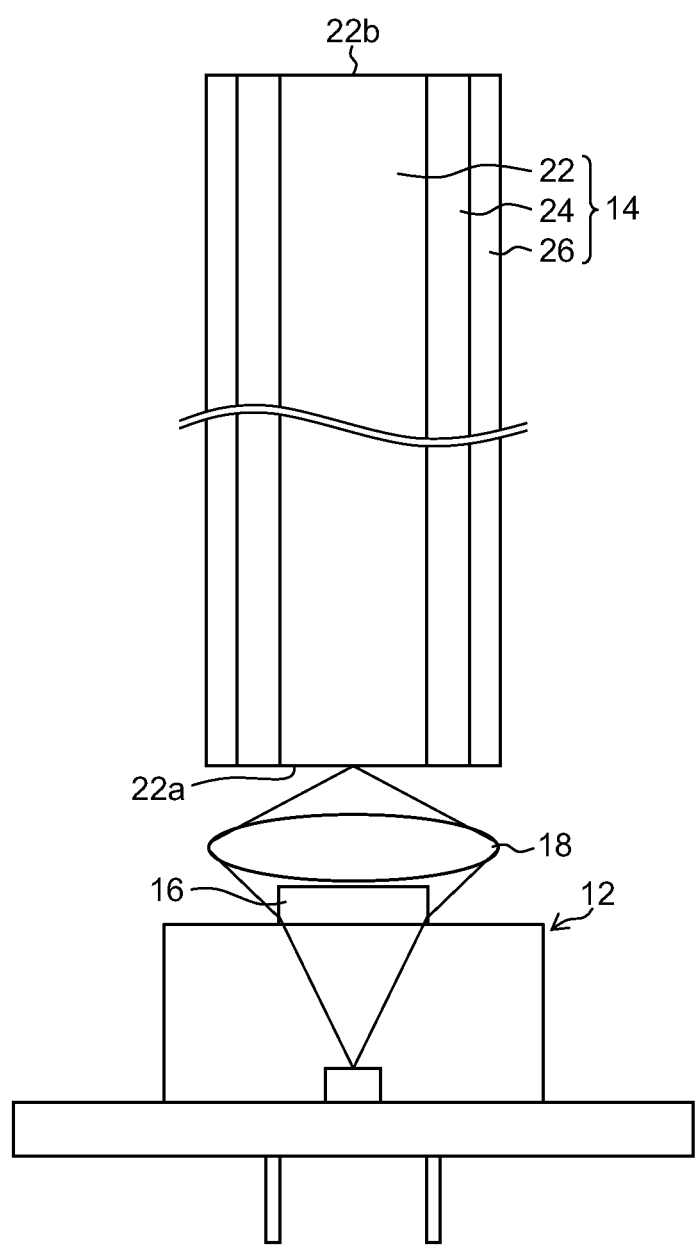
FIG. 14 is a sectional view illustrating another configuration of the optical fiber used in a vehicle headlight according to the disclosed subject matter.
Figure 15A:
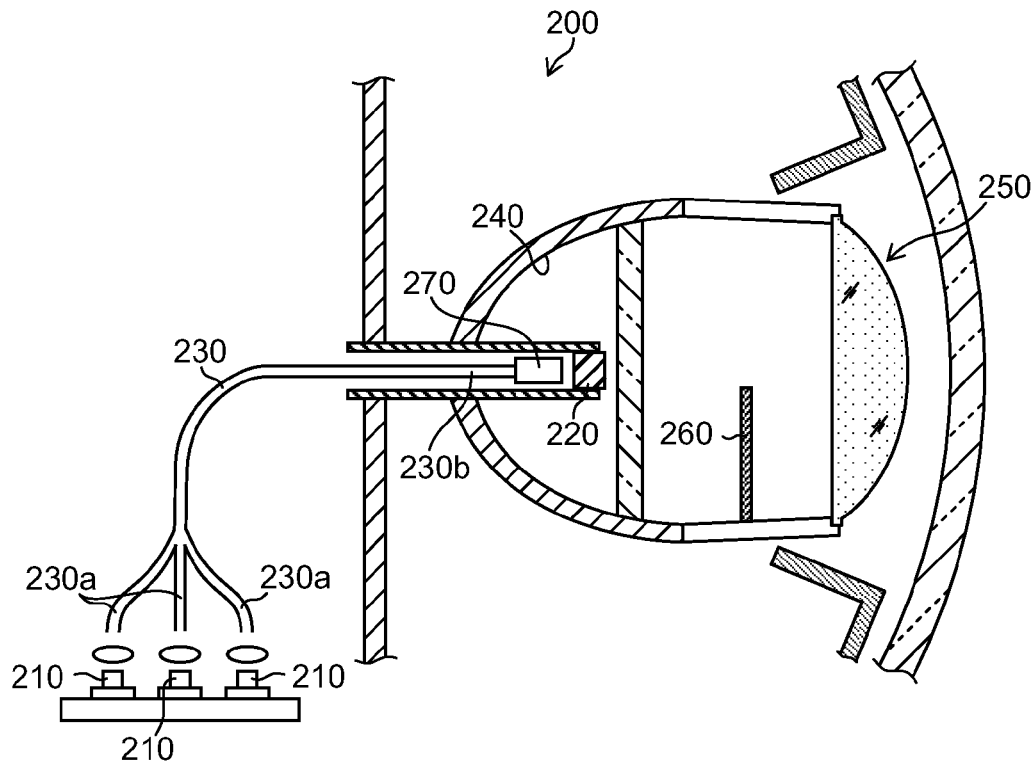
FIG. 15A is a sectional view of a conventional vehicle headlight.
Figure 15B:
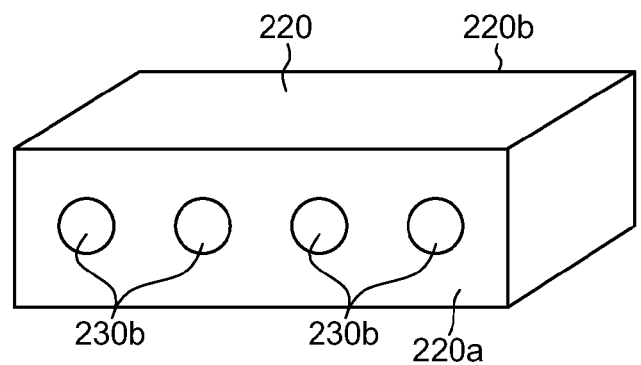
FIG. 15B is a perspective view of a fluorescent body used in the conventional vehicle headlight of FIG. 15A.

In the embodiment, the example is explained in which the wavelength conversion member 16 is arranged on the emission end face group 76a (see FIG. 2). However, as illustrated in FIG. 14, the wavelength conversion member 16 may be arranged between the laser beam source 12 and the condensing lens 18.

Consequently, in the vehicle headlight 10 including the optical fibers 14, it is possible to realize the rectangular light emitting section (emission end face group 76a, etc.) that uniformly (or substantially uniformly) emits light with reduced luminance unevenness. Even if the optical fiber 14 is broken, light leaking from the broken part is not a laser beam and is light from the wavelength conversion member 16. Therefore, there is also an advantage that eye safe can be realized.

In this case, the optical system 20 projects a light source image of the rectangular light emitting section (emission end face group 76a, etc.), which uniformly (or substantially uniformly) emits light with reduced luminance unevenness, and forms a predetermined light distribution pattern (a light distribution pattern for a low beam or a light distribution pattern for a high beam) as explained above.

The embodiment is only a mere illustration in all aspects. The presently disclosed subject matter should not be limitedly interpreted according to the above description. The presently disclosed subject matter can be carried out in other various forms without departing from the spirit or the main features of the presently disclosed subject matter.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle headlight comprising:
    a plurality of laser beam sources;
    an optical fiber bundle including a plurality of optical fibers, the plurality of optical fibers respectively corresponding to the plurality of laser beam sources, each respective optical fiber including a core having an incident end face configured such that a laser beam emitted from a respective laser beam source of the plurality of laser beam sources is incident on the incident end face, and the core also having an emission end face configured to emit the laser beam previously incident on the incident end face, and each optical fiber including a clad located adjacent the core;
    a wavelength conversion member configured to receive the laser beam emitted from the emission end face and to convert at least a part of the laser beam into light having a wavelength different from a wavelength of the laser beam; and
    an optical system configured to project a light source image of the wavelength conversion member and form a predetermined light distribution pattern,
    wherein emission end faces of the respective plurality of optical fibers are located adjacent to one another on a substantially same plane to form an emission end face group, and an external shape of the emission end face group is a substantial rectangle,
    the wavelength conversion member is located adjacent the emission end face group,
    an external shape of the wavelength conversion member is substantially the same as the external shape of the emission end face group, and
    the wavelength conversion member is located on the emission end face group in a state in which the external shape of the wavelength conversion member and the external shape of the emission end face group substantially coincide with each other and the wavelength conversion member covers emission end faces of the emission end face group.

2. The vehicle headlight according to claim 1, wherein each of the plurality of optical fibers is bound into an individual optical fiber bundle, each of the plurality of optical fibers including the core having the incident end face on which the laser beam emitted from the laser beam source corresponding thereto among the plurality of laser beam sources is incident and the emission end face from which the laser beam introduced from the incident end face is emitted, and the clad surrounds the core.

3. The vehicle headlight according to claim 1, wherein the core is configured such that a cross section of the core taken perpendicular to a longitudinal axis of a respective optical fiber is a substantial rectangle.

4. The vehicle headlight according to claim 3, wherein the core is configured such that a core cross section of a part of the core including the incident end face is a substantial circle and a core cross section of a part of the core including the emission end face is a substantial rectangle.

5. The vehicle headlight according to claim 1, wherein the plurality of optical fibers are fused to one another at least at ends on an emission end face side.

6. The vehicle headlight according to claim 1, wherein a ratio of a short side with respect to a long side of the substantial rectangle external shape of the emission end face group is 1:2 to 1:8.

7. The vehicle headlight according to claim 1, wherein one long side forming the external shape of the emission end face group includes a side corresponding to a left horizontal cutoff line, a side corresponding to a right horizontal cutoff line, and a side corresponding to an oblique cutoff line that connects the left horizontal cutoff line and the right horizontal cutoff line.

8. The vehicle headlight according to claim 1, further comprising a shade configured to cover a part of the emission end face group.

9. The vehicle headlight according to claim 1, further comprising:
    a detecting device configured to detect an object in front of a vehicle to which the vehicle headlight is connected; and
    a control device configured to individually subject the plurality of laser beam sources to on/off control based on a detection result of the detecting device,
    wherein the wavelength conversion member is divided into a plurality of wavelength conversion members corresponding to emission end faces of the respective plurality of optical fibers,
    the plurality of wavelength conversion members are respectively located on the emission end faces, and
    a light blocking member is located among the divided plurality of wavelength conversion members in order to prevent light from an individual wavelength conversion member from being made incident on a wavelength conversion member around the individual wavelength conversion member.

10. The vehicle headlight according to claim 1, wherein the optical system includes at least one of a reflection surface, a lens, and a light guide body.

11. An optical fiber bundle for use in a vehicle headlight, comprising:
    a plurality of optical fibers bound together, each of the optical fibers including a core having an incident end face configured to receive light, and an emission end face from which the light is emitted, and a clad adjacent the core,
    wherein emission end faces of the respective plurality of optical fibers are located adjacent to one another on a substantially same plane and define an emission end face group, an external shape of the emission end face group being a substantial rectangle,
    wherein each of the plurality of optical fibers is configured as an individual optical fiber bundle including the plurality of individual optical fibers bound together, an individual optical fiber of the plurality of optical fibers including the core with the incident end face on which the light in the form of a laser beam is made incident, and the individual optical fiber including the emission end face from which the laser beam introduced from the incident end face is emitted, and
    wherein the clad surrounds the core.

12. The optical fiber bundle for use in the vehicle headlight according to claim 11, wherein the core is configured such that a cross section of the core taken perpendicular to a longitudinal axis of a respective one of the plurality of optical fibers is a substantial rectangle.

13. The optical fiber bundle for use in the vehicle headlight according to claim 12, wherein the core is configured such that a core cross section of a part of the core including the incident end face is a substantial circle and a core cross section of a part of the core including the emission end face is a substantial rectangle.

14. The optical fiber bundle for use in the vehicle headlight according to claim 11, wherein the plurality of optical fibers are fused to one another at least at ends on an emission end face side.

15. The optical fiber bundle for use in the vehicle headlight according to claim 11, wherein a ratio of a short side and a long side of the substantial rectangle external shape of the emission end face group is 1:2 to 1:8.

16. The optical fiber bundle for use in the vehicle headlight according to claim 11, wherein one long side forming the external shape of the emission end face group includes a side corresponding to a left horizontal cutoff line, a side corresponding to a right horizontal cutoff line, and a side corresponding to an oblique cutoff line that connects the left horizontal cutoff line and the right horizontal cutoff line.

17. A vehicle headlight comprising:
a plurality of laser beam sources;
a plurality of wavelength conversion members respectively corresponding to the plurality of laser beam sources, a wavelength conversion member of the plurality of wavelength conversion members configured to receive a laser beam emitted from a respective laser beam source of the plurality of laser beam sources, the wavelength conversion member configured to convert at least a part of the laser beam into light having a wavelength different from a wavelength of the laser beam;
an optical fiber bundle including a plurality of optical fibers bound together and respectively corresponding to the plurality of wavelength conversion members, each optical fiber of the plurality of optical fibers including a core having an incident end face on which light from the wavelength conversion member corresponding thereto among the plurality of wavelength conversion members is incident and an emission end face from which the light introduced from the incident end face is emitted, and a clad adjacent the core; and an optical system configured to project a light source image of the emission end face and form a predetermined light distribution pattern, wherein emission end faces of the respective plurality of optical fibers are arranged adjacent to one another on a substantially same plane and define an emission end face group, an external shape of the emission end face group being a substantial rectangle, and the wavelength conversion members are arranged between the laser beam sources and the incident end face of each of the respective plurality of optical fibers.

18. The vehicle headlight according to claim 17, wherein each of the plurality of optical fibers is bound to each other to form an individual optical fiber bundle, each of the plurality of optical fibers including the core including the incident end face on which light from the wavelength conversion member corresponding thereto among the plurality of wavelength conversion members is incident, and the emission end face from which the light introduced from the incident end face is emitted, wherein the clad surrounds the core.

* * * * *